(12) United States Patent
Hu et al.

(10) Patent No.: US 12,313,602 B1
(45) Date of Patent: May 27, 2025

(54) METHOD FOR DETERMINING COMPRESSIVE BEARING CAPACITY OF COMPRESSION-CAST RUBBER FINE AGGREGATE CONCRETE

(71) Applicant: Shenzhen University, Shenzhen (CN)

(72) Inventors: Biao Hu, Shenzhen (CN); Yingwu Zhou, Shenzhen (CN); Hao Li, Shenzhen (CN); Feng Xing, Shenzhen (CN); Yufei Wu, Shenzhen (CN); Zhongfeng Zhu, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 18/904,648

(22) Filed: Oct. 2, 2024

(30) Foreign Application Priority Data

Nov. 28, 2023 (CN) .......................... 202311611914.7

(51) Int. Cl.
*G01N 3/08* (2006.01)
(52) U.S. Cl.
CPC ....... *G01N 3/08* (2013.01); *G01N 2203/0019* (2013.01); *G01N 2203/0218* (2013.01)
(58) Field of Classification Search
CPC .... G01N 3/08; G01N 3/00; G01N 2203/0019; G01N 2203/0016; G01N 2203/0014; G01N 2203/00; G01N 2203/0218; G01N 2203/0212; G01N 2203/0202; G01N 2203/02
See application file for complete search history.

(56) References Cited

U.S. PATENT DOCUMENTS

| | | | | |
|---|---|---|---|---|
| 11,268,888 | B1 * | 3/2022 | Mullins | G01N 33/383 |
| 2011/0004333 | A1 * | 1/2011 | Andersen | G05D 11/135 |
| | | | | 700/265 |
| 2014/0241104 | A1 * | 8/2014 | Phares | C04B 40/0032 |
| | | | | 366/6 |

OTHER PUBLICATIONS

CNIPA, Office Action, Application No. 202311611914.7, May 31, 2024.

(Continued)

*Primary Examiner* — Mohamed Charioui
(74) *Attorney, Agent, or Firm* — WCF IP

(57) ABSTRACT

A method for determining a compressive strength of compression-cast rubber fine aggregate concrete is provided. The method includes: first strength information of normal cast concrete, second strength information of corresponding normal cast rubber fine aggregate concrete, and third strength information of compression-cast rubber fine aggregate concrete; a target equation between a compressive strength of the normal cast concrete, a compressive strength of the compression-cast rubber fine aggregate concrete, the rubber substitution rate and a compression stress is constructed according to the first strength information, the second strength information and the third strength information; target parameters of the compression-cast rubber fine aggregate concrete are acquired, and the target parameters are inputted into the target equation which outputs a current compressive strength of the compression-cast rubber fine aggregate concrete. The compressive strength of the compression-cast rubber fine aggregate concrete can be accurately determined.

16 Claims, 12 Drawing Sheets

(56) References Cited

OTHER PUBLICATIONS

GB/T14685-2011, "Sand for construction", 2009.
GB/T14685-2011, "pebble and crushed stone for construction", 2009.
GB/T50081-2019, "Standard for Test Methods of Physical and Mechanical Properties of Concrete", 2015.

* cited by examiner

Acquire first strength information of normal cast concrete, second strength information of corresponding normal cast rubber fine aggregate concrete at a rubber substitution rate, and third strength information of compression-cast rubber fine aggregate concrete at the rubber substitution rate — S101

Construct an initial equation between a compressive strength of the normal cast concrete and a compressive strength of corresponding normal cast rubber fine aggregate concrete at any rubber substitution rate according to the first strength information and the second strength information — S102

Construct a target equation between the compressive strength of the normal cast concrete, a compressive strength of the compression-cast rubber fine aggregate concrete, the rubber substitution rate and a compression stress according to the third strength information and the initial equation — S103

Acquire target parameters of the compression-cast rubber fine aggregate concrete, and inputting the target parameters into the target equation which outputs a current compressive strength of the compression-cast rubber fine aggregate concrete; wherein the target parameters comprise one of the rubber substitution rate, the compression stress and the compressive strength of the normal cast concrete — S104

FIG. 2

METHOD FOR DETERMINING COMPRESSIVE BEARING CAPACITY OF COMPRESSION-CAST RUBBER FINE AGGREGATE CONCRETE

CROSS-REFERENCE TO RELATED APPLICATION

This patent application claims the benefit and priority of Chinese Patent Application No. 202311611914.7 filed with the China National Intellectual Property Administration on Nov. 28, 2023, the disclosure of which is incorporated by reference herein in its entirety as part of the present disclosure.

TECHNICAL FIELD

The present disclosure relates to the technical field of civil engineering materials, in particular to a method, a system, a terminal and a computer-readable storage medium for determining a compressive bearing capacity of compression-cast rubber fine aggregate concrete.

BACKGROUND

The traditional methods of disposing of waste tires mainly include landfill or incineration. The landfill process not only wastes a lot of land resources and results in environmental pollution but also leads to a large number of bacteria. The incineration process also produces a lot of black pollution, which can pose a great threat to human health. Natural sand and stone in concrete are non-renewable materials (in the short term). Uncontrolled exploitation will lead to a shortage of resources and irreversible damage to the ecological environment. Rubber is added to concrete as aggregate, which not only can reduce the great harm to the environment resulting from improper handling of rubber, but also reduces the over-exploitation of resources such as sand and gravel. Therefore, in order to promote green recycling of rubber materials, it is urgent to promote the research and utilization of rubber concrete. However, the addition of rubber to concrete will result in a decrease in the strength and the elastic modulus. Furthermore, the degree of decrease is related to the content and the particle size of rubber.

In the existing design scheme, the concrete strength of various rubber concrete prepared at different rubber substitution rates is lower than that of normal cast concrete, and the strength of compression-cast concrete varies compared with that of normal cast concrete. On the basis that the target parameters including data of at least one of the rubber substitution rates, the compression stress and the compressive strength of normal cast concrete have been determined, it is impossible to determine the compressive strength of compression-cast rubber fine aggregate concrete through other data.

Therefore, the prior art needs to be improved and developed.

SUMMARY

The main purpose of the present disclosure is to provide a method for determining a compressive bearing capacity of compression-cast rubber fine aggregate concrete, aiming at solving the problem in the prior art on the basis that the data of at least one of the rubber substitution rate, the compression stress and the compressive strength of normal cast concrete has been determined, it is impossible to determine the compressive strength of rubber fine aggregate concrete prepared under these three data accurately through other data.

A first aspect of the embodiment of the present disclosure provides a method for determining a compressive bearing capacity of compression-cast rubber fine aggregate concrete, where the method for determining the compressive bearing capacity of compression-cast rubber fine aggregate concrete includes: acquiring first strength information of normal cast concrete, second strength information of corresponding normal cast rubber fine aggregate concrete at a rubber substitution rate, and third strength information of compression-cast rubber fine aggregate concrete at the rubber substitution rate; constructing an initial equation between a compressive strength of normal cast concrete and a compressive strength of corresponding normal cast rubber fine aggregate concrete at any rubber substitution rate according to the first strength information and the second strength information; constructing a target equation between the compressive strength of normal cast concrete, a compressive strength of the compression-cast rubber fine aggregate concrete, the rubber substitution rate and a compression stress according to the third strength information and the initial equation; and acquiring target parameters of the compression-cast rubber fine aggregate concrete, and inputting the target parameters into the target equation which outputs a current compressive strength of the compression-cast rubber fine aggregate concrete; wherein the target parameters comprise one of the rubber substitution rate, the compression stress and the compressive strength of normal cast concrete.

In some embodiments, mixture ratios of cementing materials, coarse aggregates and fine aggregates among the normal cast concrete, the rubber substitution of the normal cast rubber fine aggregate concrete and the compression-cast rubber fine aggregate concrete are the same; acquiring first strength information of normal cast concrete, second strength information of corresponding normal cast rubber fine aggregate concrete at a rubber substitution rate specifically includes: carrying out a compressive test on the normal cast concrete to obtain the first strength information of the normal cast concrete; carrying out compressive tests on various normal cast rubber fine aggregate concrete at different rubber substitution rates to obtain the second strength information corresponding to the various normal cast rubber fine aggregate concrete.

In some embodiments, constructing an initial equation between a compressive strength of normal cast concrete and a compressive strength of corresponding normal cast rubber fine aggregate concrete at any rubber substitution rate according to the first strength information and the second strength information specifically includes: analyzing the first strength information and various second strength information at different rubber substitution rates to obtain a first coefficient of the rubber substitution rate; generating the initial equation between the compressive strength of the normal cast concrete and the compressive strength of corresponding normal cast rubber fine aggregate concrete at any rubber substitution rate according to the first coefficient.

In some embodiments, the method for determining the compressive bearing capacity of compression-cast rubber fine aggregate concrete further includes: acquiring the compressive strength of the normal cast concrete and strengths of corresponding compression-cast concrete at different compression stresses; obtaining a quadratic function relation between the compressive strength of the normal cast concrete and the strength of the normal compression-cast concrete according to the compressive strength of the normal cast concrete and the strengths of various normal compression-cast concrete.

In some embodiments, acquiring third strength information of compression-cast rubber fine aggregate concrete at the rubber substitution rate specifically includes: acquiring respective compression stresses of various compression-cast rubber fine aggregate concrete at different rubber substitution rates, wherein the rubber substitution rates of the various compression-cast rubber fine aggregate concrete correspond to and are same as rubber substitution rates of various normal cast rubber fine aggregate concrete; carrying out a compressive test on the compression-cast rubber fine aggregate concrete at a corresponding rubber substitution rate according to the compression stress to obtain the third strength information corresponding to each of the various compression-cast rubber fine aggregate concrete.

In some embodiments, constructing a target equation between the compressive strength of the normal cast concrete, the compressive strength of the compression-cast rubber fine aggregate concrete, the rubber substitution rate and compression stress according to the third strength information and the initial equation specifically includes: obtaining a transition equation between the compressive strength of the compression-cast rubber fine aggregate concrete and the compressive strength of the normal cast rubber fine aggregate concrete according to the initial equation and the third strength information; obtaining the target equation between the compressive strength of the normal cast concrete and the compression-cast rubber fine aggregate concrete, the rubber substitution rate and the compression stress according to the quadratic function relation and the transition equation.

In some embodiments, acquiring target parameters of the compression-cast rubber fine aggregate concrete, and inputting the target parameters into the target equation which outputs a current compressive strength of the compression-cast rubber fine aggregate concrete specifically includes: acquiring determined data of the target parameters and a preset target strength of the compression-cast rubber fine aggregate concrete, inputting the preset target strength as the compressive strength and the determined data into the target equation which outputs a data range of parameters to be confirmed, and determining target data of the parameters to be confirmed according to the data range; inputting the determined data and the target data into the target equation which outputs a current compressive strength of the compression-cast rubber fine aggregate concrete to enable the current compressive strength to be above the preset target strength.

A second aspect of the embodiment of the present disclosure provides a system for determining a compressive bearing capacity of compression-cast rubber fine aggregate concrete, the system for determining the compressive bearing capacity of compression-cast rubber fine aggregate concrete includes: a data acquiring module configured to acquire first strength information of normal cast concrete, second strength information of corresponding normal cast rubber fine aggregate concrete at a rubber substitution rate, and third strength information of compression-cast rubber fine aggregate concrete at the rubber substitution rate; an equation constructing module configured to construct an initial equation between a compressive strength of normal cast concrete and a compressive strength of corresponding normal cast rubber fine aggregate concrete at any rubber substitution rate according to the first strength information and the second strength information; an equation determining module configured to construct a target equation between a compressive strength of the normal cast concrete, a compressive strength of the compression-cast rubber fine aggregate concrete, the rubber substitution rate and a compression stress according to the third strength information and the initial equation; and a strength generating module configured to acquire target parameters of the compression-cast rubber fine aggregate concrete, and input the target parameters into the target equation which outputs a current compressive strength of the compression-cast rubber fine aggregate concrete; wherein the target parameters comprise one of the rubber substitution rate, the compression stress and the compressive strength of normal cast concrete.

A third aspect of the embodiment of the present disclosure provides a terminal, the terminal includes a memory, a processor, and a program for determining a compressive bearing capacity of compression-cast rubber fine aggregate concrete, which is stored in the memory and is operable on the processor, and the program for determining the compressive bearing capacity of compression-cast rubber fine aggregate concrete, when executed by the processor, implements steps of the method for determining the compressive bearing capacity of compression-cast rubber fine aggregate concrete as described in any one of the above.

A fourth aspect of the embodiment of the present disclosure provides a computer-readable storage medium, the computer-readable storage medium stores a program for determining a compressive bearing capacity of compression-cast rubber fine aggregate concrete, and the program for determining the compressive bearing capacity of compression-cast rubber fine aggregate concrete, when executed by a processor, implements steps of the method for determining the compressive bearing capacity of compression-cast rubber fine aggregate concrete as described in any one of the above.

Beneficial effects: the present disclosure provides a method for determining the compressive bearing capacity of compression-cast rubber fine aggregate concrete. In the method, the relationship among normal cast concrete which is not compression-cast and has no rubber to replace fine aggregates, normal cast rubber fine aggregate concrete at a certain rubber substitution rate, and compression-cast rubber fine aggregate concrete with the same rubber substitution rate is analyzed to determine the mathematical relationship among the strength of compression-cast rubber fine aggregate concrete at a certain rubber substitution rate, the compressive strength of normal cast concrete and the compression casting stress. Given the compressive strength of normal cast concrete and the ratio of substituting fine aggregates with fine rubber, the compressive strength of normal cast rubber fine aggregate concrete can be accurately calculated, and the required compression casting stress can be accurately calculated according to the target strength of compression-cast rubber fine aggregate concrete.

BRIEF DESCRIPTION OF THE DRAWINGS

In order to explain technical solutions of the embodiments of the present disclosure or in the prior art more clearly, the drawings that need to be used in the embodiments or in the prior art will be briefly introduced. Apparently, the drawings in the following description are only some embodiments of the present disclosure. For those skilled in the art, other drawings can be obtained according to these drawings without creative labor.

FIG. 2 is a flowchart of a preferred embodiment of a method for determining the compressive bearing capacity of compression-cast rubber fine aggregate concrete according to the present disclosure;

Figure 1:
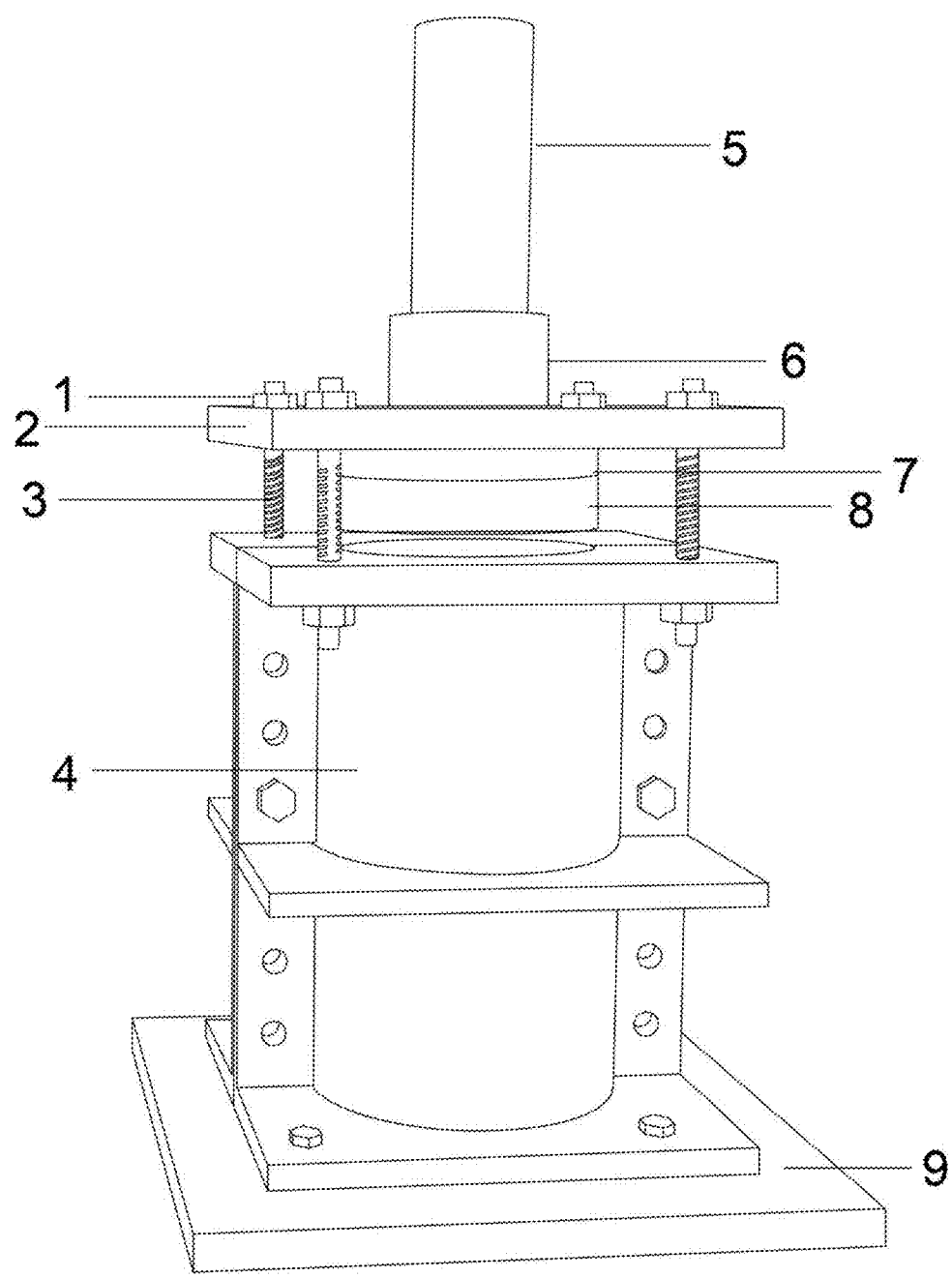
FIG. 1 is a schematic diagram of a concrete compression casting device used in a method for determining a compressive bearing capacity of compression-cast rubber fine aggregate concrete according to the present disclosure.
Figure 3A:
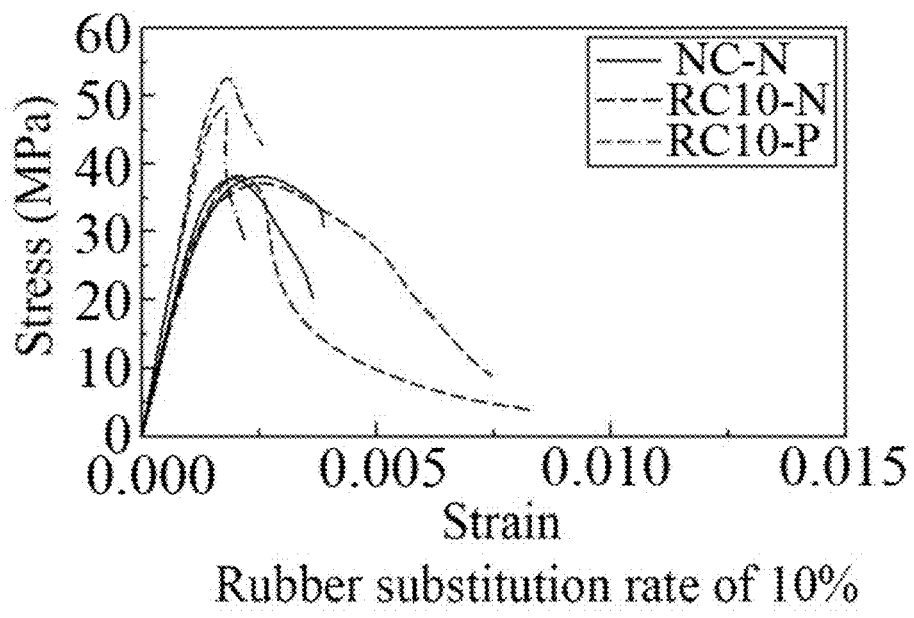
FIG. 3A-FIG. 3H are stress-strain graphs of compression-cast rubber fine aggregate concrete prepared at different rubber substitution rates compared with normal cast concrete and normal cast rubber fine aggregate concrete of a method for determining the compressive bearing capacity of compression-cast rubber fine aggregate concrete according to the present disclosure.
Figure 3B:
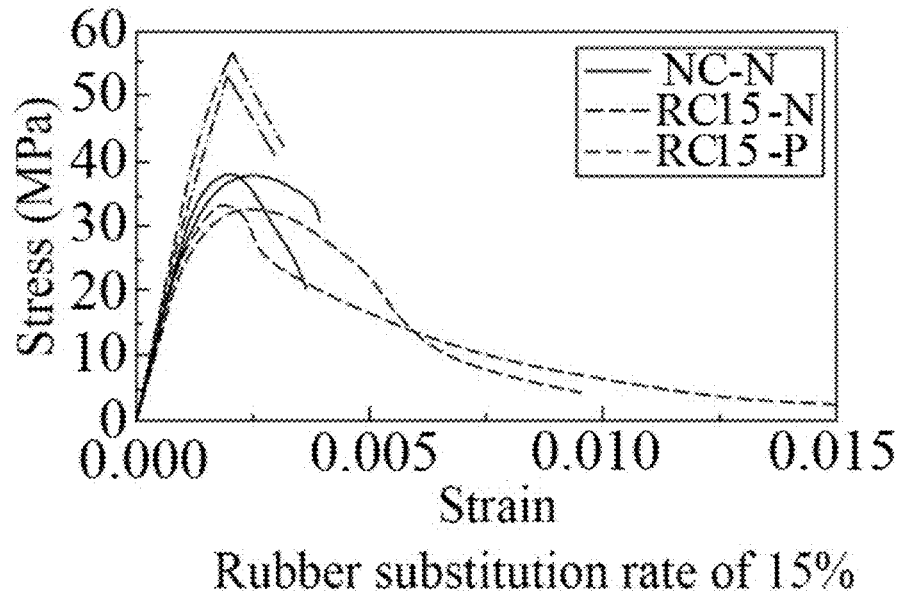
Figure 3C:
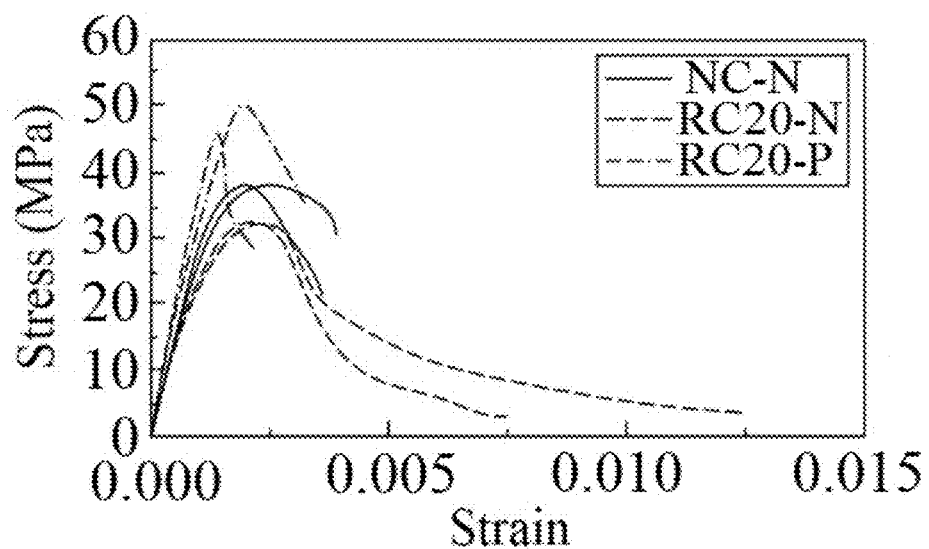
Figure 3D:
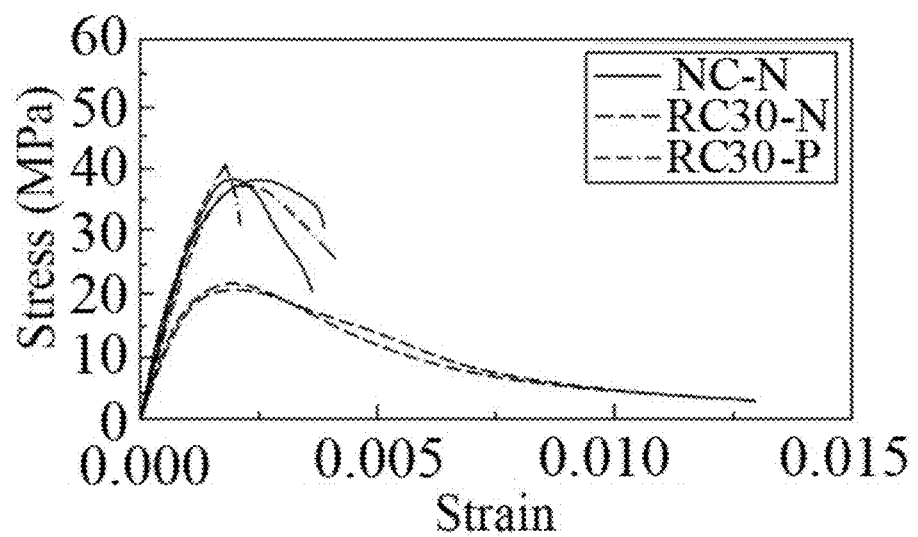
Figure 3E:
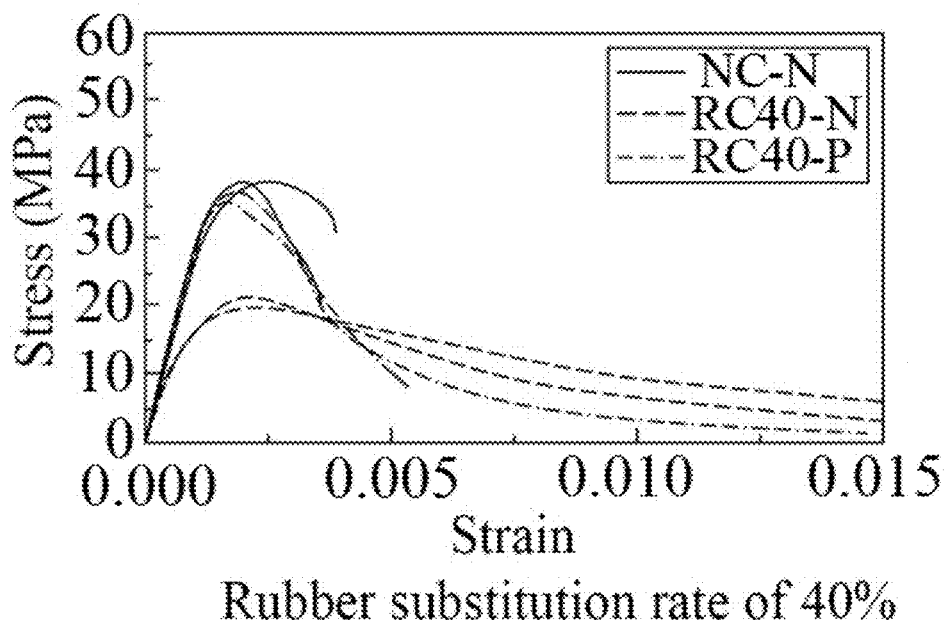
Figure 3F:
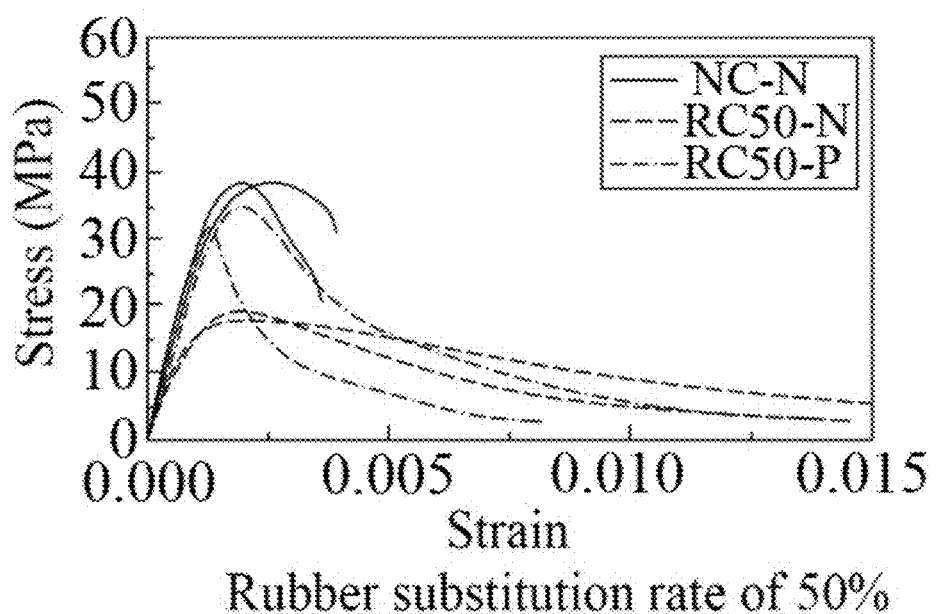
Figure 3G:
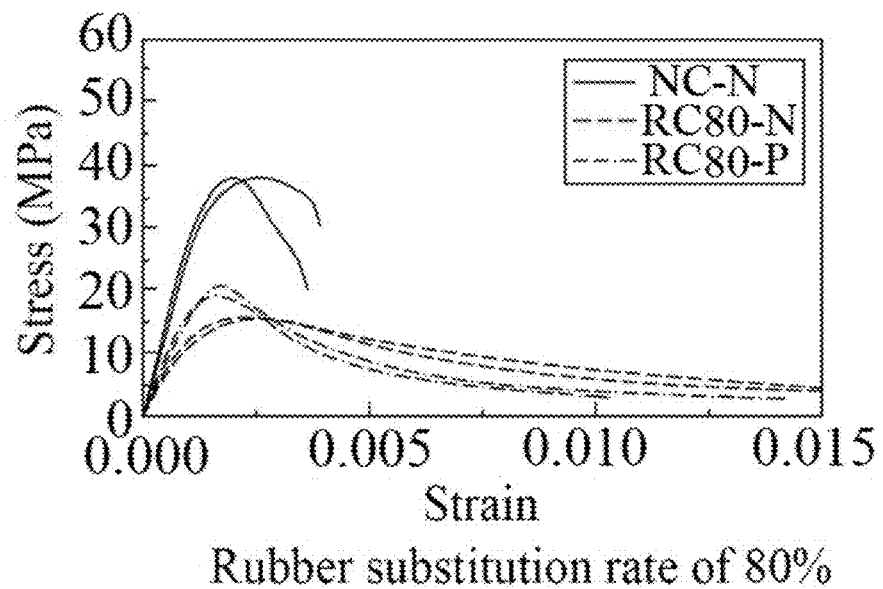
Figure 3H:
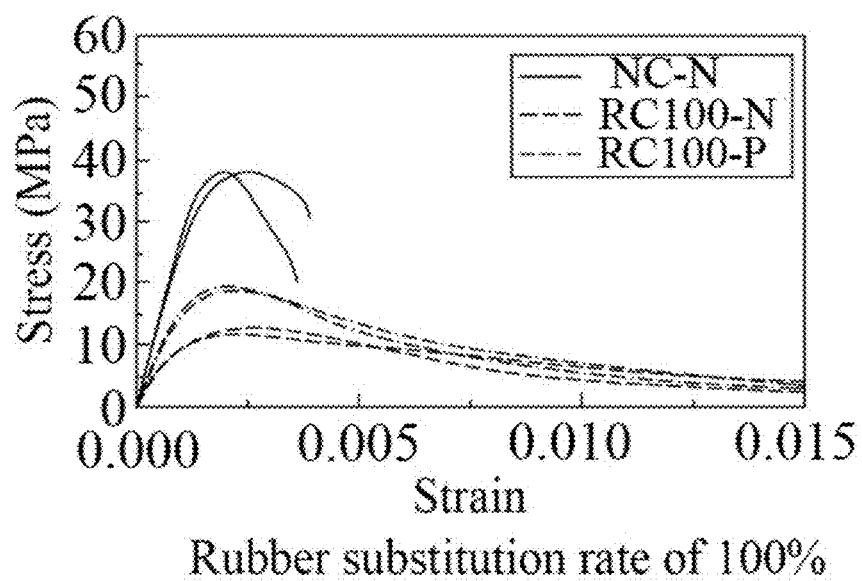

Description of reference numerals: 1 nut; 2 anti-pressure rebound cover plate; 3 high-strength bolt; 4 cylinder mold; 5 jack; 6 pressure head structure; 7 force sensor; 8 pressure-applying raised head; 9 bottom plate.

DETAILED DESCRIPTION OF THE EMBODIMENTS

In order to make the above purposes, technical solutions and effects of the present disclosure more clear and definite, the technical solutions in the embodiments of the present disclosure will be clearly and completely described with reference to the drawings in the embodiments of the present disclosure hereinafter. The described embodiments are only possible technical implementations of the present disclosure, rather than all of the possible implementations. Based on the embodiment of the present disclosure, those skilled in the art can completely combine the embodiments of the present disclosure to obtain other embodiments without creative labor, which fall within the scope of protection of the present disclosure.

Hereinafter, the method for determining the compressive bearing capacity of the compression-cast rubber fine aggregate concrete according to the embodiment of the present disclosure will be described with reference to the attached drawings. Aiming at the above-mentioned problem in the prior art that on the basis that data of at least one of the rubber substitution rates, the compression stress and the compressive strength of normal cast concrete has been determined, it is impossible to determine the compressive strength of compression-cast rubber fine aggregate concrete prepared under these three data accurately through other data. The present disclosure provides a method for determining a compressive bearing capacity of compression-cast rubber fine aggregate concrete. In the method, the relationship among normal cast concrete which is not compression-cast and has no rubber to replace fine aggregates, normal cast rubber fine aggregate concrete at a certain rubber substitution rate and compression-cast rubber fine aggregate concrete at the same rubber substitution rate is analyzed to determine the mathematical relationship (that is, the target equation) among the strength of compression-cast rubber fine aggregate concrete at a certain rubber substitution rate, the compressive strength of normal cast concrete and the compression casting stress. Given the compressive strength of normal cast concrete and the ratio of substituting fine aggregates with fine rubber, the compressive strength of normal cast rubber fine aggregate concrete can be accurately calculated (the target equation can be used to calculate the compressive strength of compression-cast rubber concrete), and the required compression casting stress (one or two of the compression stress, the rubber substitution rate and the mixture ratio) can be accurately calculated according to the target strength of compression-cast rubber concrete, which provides theoretical support for the preparation and design of compression-cast rubber concrete. Therefore, the technical problem in the prior art is that on the basis that data of at least one of the rubber substitution rates, the compression stress and the compressive strength of normal cast concrete has been determined, it is impossible to determine the compressive strength of compression-cast rubber fine aggregate concrete prepared under these three data accurately through other data.

The present disclosure can accurately determine the compressive strength of the compression-cast rubber fine aggregate concrete and can provide a method for preparing compression-cast rubber fine aggregate concrete meeting the target strength (that is, according to at least one of the target parameters).

It can be understood that the compressive bearing capacity refers to the maximum load that concrete can bear when subjected to pressure, and is usually used to measure the maximum capacity of concrete structures such as columns and piers not to be damaged when subjected to pressure. Once the compressive members are damaged, the whole structure will often be damaged or even collapsed. The compressive strength is a measure of the maximum stress that concrete can bear when it is damaged due to being subjected to pressure. The compressive strength is a basic mechanical property index of concrete, which is usually determined by laboratory tests. The compressive bearing capacity is a comprehensive index, which is not only related to the compressive strength of concrete but also related to other factors such as size, shape and reinforcement. The compressive strength mainly focuses on the resistance of concrete when subjected to the compressive force, which is a more specific physical property. The compressive bearing capacity of the present disclosure is the compressive strength of compression-cast rubber fine aggregate concrete with the determined shape and size.

The technology of compression-cast rubber fine aggregate concrete at a certain rubber substitution rate is a physically modified concrete technology, which is suitable for improving the mechanical properties of various solid waste concrete (including normal cast concrete), reducing porosity and improving durability.

The schematic diagram of a concrete compression casting device of the present disclosure is shown in FIG. 1. An upper part of a bottom plate 9 is a cylindrical mold 4. An upper part of the cylindrical mold 4 is connected with an anti-pressure rebound plate (anti-pressure rebound cover plate) through high-strength bolts 3. The anti-pressure rebound plate includes an anti-pressure rebound cover plate 2, a force sensor 7 and a pressure-applying raised head 8 which are connected together. An upper part of the anti-pressure rebound cover plate 2 is connected with a jack 5 through a pressure head structure 6. The working principle of the concrete compression casting device is as follows: the concrete casting device applies pressure on the newly casted concrete in a manner of self-balancing under stress and physical pressurization. The high-pressure jack 5 is fixed on an upper part of a steel mold structure and is connected with a lower bottom plate at a lower part of the steel mold structure by four high-strength bolts 3. In the actual working process, the high-pressure jack 5 applies a compression stress to the anti-pressure rebound plate (i.e., the anti-pressure rebound cover plate) through the pressure head structure 6, so that the anti-pressure rebound cover plate compresses the rubber concrete located in the cylindrical mold 4. After the jack reaches the target compression stress applied to the rubber concrete through the pressure-applying raised head 8 of the anti-pressure rebound cover plate, the high-strength bolts 3 are tightened through the nuts 1. With the continuous tightening of the bolts, the pressure of the jack is correspondingly reduced. When the pressure of the jack drops to 0, the bolts are stopped from screwing, and then the jack is removed. After standing for a period of time, when the strength and the crack resistance of the compression-cast rubber fine aggregate concrete can resist its resilience, the mold can be removed.

The technical solutions of the present disclosure will be described in detail with specific embodiments. The following specific embodiments can be combined with each other, and the same or similar concepts or processes may not be described in detail in some embodiments.

As shown in FIG. 2, the method for determining the compressive bearing capacity of compression-cast rubber fine aggregate concrete in the preferred embodiment of the present disclosure is provided. The method for determining the compressive bearing capacity of compression-cast rubber fine aggregate concrete includes the following steps.

Step S101, first strength information of normal cast concrete, second strength information of corresponding normal cast rubber fine aggregate concrete at a rubber substitution rate, and third strength information of compression-cast rubber fine aggregate concrete at the rubber substitution rate are acquired.

It can be understood that the mixture ratios of cementing materials, coarse aggregates and fine aggregates among the normal cast concrete, the normal cast rubber fine aggregate concrete at the rubber substitution rate and the compression-cast rubber fine aggregate concrete at the rubber substitution rate are the same. That is to say, the mixture ratio of normal cast concrete is determined, that is, fine aggregates (sand), coarse aggregates (stone) and cementing materials (cement) with a certain aggregate granular composition are selected. The proportion of fine aggregates (sand and rubber) in normal cast rubber fine aggregate concrete and compression-cast rubber fine aggregate concrete is the same as the fine aggregates in normal cast concrete. The proportion of sand and fine rubber in fine aggregates of normal cast rubber fine aggregate concrete and the compression-cast rubber fine aggregate concrete is the same, that is, the same rubber substitution rate is used.

In some embodiments, a compressive test is carried out on the normal cast concrete to obtain the first strength information of the normal cast concrete (including the first strength). Compressive tests are carried out on various normal cast rubber fine aggregate concrete at different rubber substitution rates to obtain the second strength information corresponding to the various normal cast rubber fine aggregate concrete (including the second strength). Respective compression stresses of the various compression-cast rubber fine aggregate concrete at different rubber substitution rates are acquired, where the rubber substitution rates of the various compression-cast rubber fine aggregate concrete correspond to and are the same as rubber substitution rates of the various normal cast rubber fine aggregate concrete. A compressive test is carried out on the compression-cast rubber fine aggregate concrete at a corresponding rubber substitution rate according to the compression stress to obtain the third strength information corresponding to each of the various compression-cast rubber fine aggregate concrete (including the third strength).

It should be noted that the normal cast concrete, the normal cast rubber fine aggregate concrete and the compression-cast rubber fine aggregate concrete with the same mixture ratio (that is, corresponding normal cast concrete, corresponding normal cast rubber fine aggregate concrete and corresponding compression-cast rubber fine aggregate concrete) can be prepared or provided in advance. According to the present disclosure, the normal cast concrete, corresponding various normal cast rubber fine aggregate concrete and corresponding various compression-cast rubber fine aggregate concrete are subjected to uniaxial compressive tests. Thus, the first compressive strength of the normal cast concrete (which can be the average of a plurality of groups, as shown in Table 3), the rubber substitution rate and the second strength of respective normal cast rubber fine aggregate concrete (which can be the average of a plurality of groups at this substitution rate, as shown in Table 3), and the rubber substitution rate and the third strength of respective compression-cast rubber fine aggregate concrete (which can be the average of a plurality of groups at this substitution rate, as shown in Table 3) are obtained respectively.

Hereinafter, the process of preparing the normal cast concrete, corresponding various normal cast rubber fine aggregate concrete and corresponding various compression-cast rubber fine aggregate concrete, as well as carrying out corresponding tests will be described.

In this embodiment, C30 (the cylinder strength is 30 MPa) concrete is designed. Coarse aggregates and fine aggregates with a certain aggregate granular composition are selected. The grain granular composition of fine aggregates is tested (Table 1). According to Table 1, the particle size of sand and rubber powder with the same granular composition in fine aggregates is distributed within the range of 0 mm-5.00 mm.

TABLE 1

Grain granular composition of river sand and fine rubber

| Nominal diameter of a sieve hole | | 5.00 (mm) | 2.50 (mm) | 1.25 (mm) | 0.63 (mm) | 0.315 (mm) | 0.16 (mm) | <0.16 (mm) | Fineness modulus | Partition |
|---|---|---|---|---|---|---|---|---|---|---|
| River Sand | separate retained percentage | 0 | 2.4 | 19.4 | 34.1 | 29.2 | 14.5 | 0.4 | 2.6 | II |
| | accumulated retained percentage | 0 | 2.4 | 21.8 | 55.9 | 85.1 | 99.6 | 100 | | |
| Fine Rubber | separate retained percentage | 0 | 2.4 | 19.4 | 34.1 | 29.2 | 14.5 | 0.4 | 2.6 | II |
| | accumulated retained percentage | 0 | 2.4 | 21.8 | 55.9 | 85.1 | 99.6 | 100 | | |

It should be noted that in the preparation of concrete, "the same granular composition" means that the particle size and distribution of sand and rubber powder are the same, that is, the proportion of sand and rubber powder is the same in the same particle size range.

First, rubber powder with a particle size of 40 to 60 meshes is selected and mixed according to a certain granular composition. The granular composition is consistent with that of sand, and water, cement and stones in the mixture ratio remain unchanged. The volume substitution rate that rubber substitutes river sand is set to 10%, 15%, 20%, 30%, 40%, 50%, 80% and 100%, respectively. In any mold shape (the mold is made according to the shape and size requirement of an actual member), the rubber concrete at each rubber substitution rate is divided into two groups. One group is added into the mold of the compression pouring device (as shown in FIG. 1), and different compressive pre-stresses are set to compact the rubber fine aggregate concrete. At the same time, a designed anti-pressure rebound plate is used to prevent the rubber fine aggregate concrete from rebounding after the compression stress is removed. The mold can be removed immediately after maintaining the compression for a certain period of time. The other group carries out normal casting. After standard curing, a uniaxial compressive test is carried out on the concrete on an MTS pressure testing machine, and its stress-strain graph is drawn to obtain its compressive strength and elastic modulus.

Specifically, according to Test Method Standard for Physical and Mechanical Properties of Concrete GB/T 50081-2019, Pebbles and Gravels for Construction GB/T 14685-2011 and Sand for Construction GB/T 14684-2011, natural coarse and fine aggregates and rubber powder needed for rubber concrete are selected and prepared, the mixture ratio of concrete is determined, the granular compositions of rubber and sand are guaranteed to be the same during the test, and the concrete is stirred. The concrete is divided into two groups. One group is cast into the compression casting mold (as shown in FIG. 1), and is vibrated by using a plug-in vibrating rod. After continuous insertion and vibration for several times, the mold filled with concrete and the loading device are centered and leveled, and a certain pre-pressure is applied. And the anti-pressure rebound plate is used to prevent the rubber concrete from rebounding after the compression stress is removed. The mold can be removed for standard curing immediately after maintaining the compression for a certain period of time. The other group is cured normally after normal casting.

Uniaxial compressive tests are carried out on the cured concrete, and the changing trend of stresses and strains before and after compression with different rubber content is analyzed.

The mixture ratios of the normal cast concrete, the normal cast rubber fine aggregate concrete and the compression-cast rubber fine aggregate concrete are shown in Table 2. NC denotes normal cast concrete. RC denotes rubber fine aggregate concrete, and the number after RC denotes the substitution rate of rubber. N after the number stands for normal casting and P after the number stands for compression casting. For example, RC10-N stands for normal cast rubber fine aggregate concrete (rubber content is 10%), and RC10-P stands for compression-cast rubber fine aggregate concrete (rubber content is 10%). Refer to Table 2 for applied compressive pre-stress at different rubber substitution rates.

TABLE 2

Mixture ratio of the normal cast concrete, the normal cast rubber fine aggregate concrete and the compression-cast rubber fine aggregate concrete

| Names of samples | Pouring stress (MPa) | Proportion of each component (kg/m³) | | | | |
|---|---|---|---|---|---|---|
| | | Natural coarse aggregates | cement | water | river sand | fine rubber |
| NC-N | — | 1128 | 380 | 201 | 691 | — |
| RC10-N | — | 1128 | 380 | 201 | 621.9 | 16.2 |
| RC10-P | 5 | 1128 | 380 | 201 | 621.9 | 16.2 |
| RC15-N | — | 1128 | 380 | 201 | 587.4 | 24.3 |
| RC15-P | 8.5 | 1128 | 380 | 201 | 587.4 | 24.3 |
| RC20-N | — | 1128 | 380 | 201 | 552.8 | 32.4 |
| RC20-P | 9.5 | 1128 | 380 | 201 | 552.8 | 32.4 |
| RC30-N | — | 1128 | 380 | 201 | 483.7 | 48.5 |
| RC30-P | 13 | 1128 | 380 | 201 | 483.7 | 48.5 |
| RC40-N | — | 1128 | 380 | 201 | 414.6 | 64.7 |
| RC40-P | 15.5 | 1128 | 380 | 201 | 414.6 | 64.7 |
| RC50-N | — | 1128 | 380 | 201 | 345.5 | 80.9 |
| RC50-P | 15.5 | 1128 | 380 | 201 | 345.5 | 80.9 |
| RC80-N | — | 1128 | 380 | 201 | 138.2 | 129.4 |
| RC80-P | 8 | 1128 | 380 | 201 | 138.2 | 129.4 |
| RC100-N | — | 1128 | 380 | 201 | — | 161.8 |
| RC100-P | 8 | 1128 | 380 | 201 | — | 161.8 |

Figure 4A:
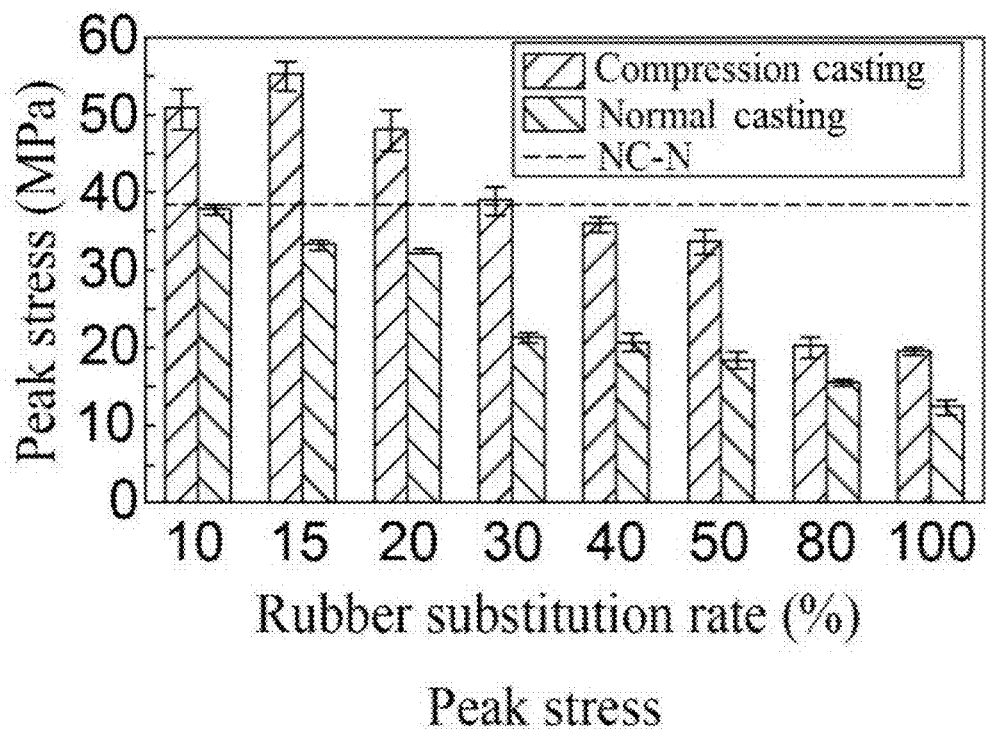
FIG. 4A is a schematic diagram of characteristics of changes in a peak stress in FIG. 3A-FIG. 3H according to the present disclosure.
Figure 4B:
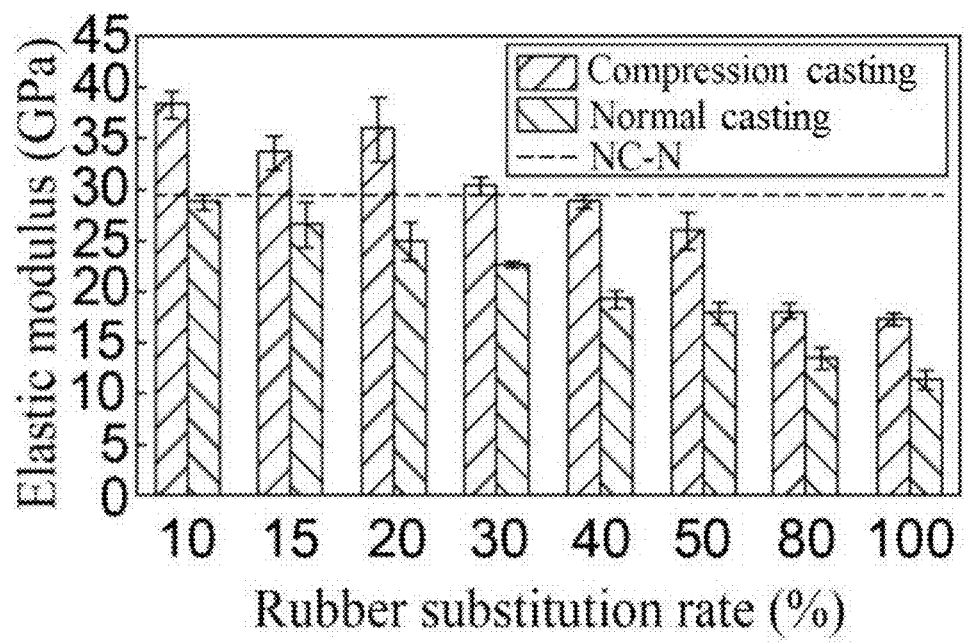
FIG. 4B is a schematic diagram of characteristics of changes in an elastic modulus in FIG. 3A-FIG. 3H according to the present disclosure.

Specifically, the compressive strength test is carried out on the concrete sample that has been cured for 28 days, so as to evaluate the changes of stress and strain characteristics of the compression-cast rubber fine aggregate concrete and the normal cast concrete (FIGS. 3A-3H and 4A-4B). It should be noted that, as shown in FIGS. 3A-3H, FIG. 3A, FIG. 3B, FIG. 3C, FIG. 3D, FIG. 3E, FIG. 3F, FIG. 3G and FIG. 3H represent stress-strain graphs of the normal cast rubber fine aggregate concrete and the compression-cast rubber fine aggregate concrete prepared at rubber substitution rates of 10%, 15%, 20%, 30%, 40%, 50%, 80% and 100% compared with the normal cast concrete, respectively, in which the abscissa represents the strain and the ordinate represents the stress (the peak stress at the highest point of the ordinate is the strength of concrete). As shown in FIGS. 4A-4B, FIG. 4A and FIG. 4B are graphs of changes in a peak stress and changes in an elastic modulus between the compression-cast rubber fine aggregate concrete at different rubber substitution rates and the normal cast concrete which is not compressed and has no rubber for substitution, respectively.

The characteristic values of stress data corresponding to the normal cast concrete, the normal cast rubber fine aggregate concrete and the compression-cast rubber fine aggregate concrete are shown in Table 3.

TABLE 3

Characteristic values of stress and strain data

| Specimen ID | Casting stress (compression stress) (MPa) | Compressive strength (MPa) | Avg. | Peak strain | Avg. |
|---|---|---|---|---|---|
| NC-N | — | 38.11 | 38.5 | 0.001972 | 0.0024 |
| NC-N | | 39.26 | | 0.002886 | |
| NC-N | | 38.07 | | 0.002418 | |
| RC10-N | — | 38.54 | 38.0 | 0.002059 | 0.0023 |
| RC10-N | | 37.44 | | 0.002509 | |
| RC10-P | 5 | 53.12 | 50.8 | 0.001872 | 0.0018 |
| RC10-P | | 48.44 | | 0.001742 | |
| RC15-N | — | 33.43 | 33.1 | 0.001910 | 0.0022 |
| RC15-N | | 32.81 | | 0.002468 | |
| RC15-P | 8.5 | 53.62 | 55.1 | 0.001922 | 0.0020 |
| RC15-P | | 56.68 | | 0.002076 | |
| RC20-N | — | 32.34 | 32.4 | 0.002420 | 0.0023 |
| RC20-N | | 32.39 | | 0.002265 | |
| RC20-P | 9.5 | 50.38 | 48.1 | 0.001992 | 0.0017 |
| RC20-P | | 45.73 | | 0.001448 | |
| RC30-N | — | 21.69 | 21.3 | 0.002054 | 0.0021 |
| RC30-N | | 20.89 | | 0.002118 | |
| RC30-P | 13 | 40.54 | 38.9 | 0.001805 | 0.0020 |
| RC30-P | | 37.33 | | 0.002158 | |
| RC40-N | — | 19.87 | 20.8 | 0.002123 | 0.0021 |
| RC40-N | | 21.66 | | 0.002065 | |
| RC40-P | 15.5 | 35.35 | 36.0 | 0.001633 | 0.0018 |
| RC40-P | | 36.72 | | 0.001901 | |
| RC50-N | — | 17.55 | 18.3 | 0.002476 | 0.0022 |
| RC50-N | | 19.14 | | 0.001999 | |
| RC50-P | 15.5 | 34.92 | 33.6 | 0.001980 | 0.0016 |
| RC50-P | | 32.23 | | 0.001316 | |
| RC80-N | — | 15.77 | 15.5 | 0.002276 | 0.0023 |
| RC80-N | | 15.27 | | 0.002337 | |
| RC80-P | 8 | 21.14 | 20.1 | 0.001747 | 0.0017 |
| RC80-P | | 19.01 | | 0.001559 | |
| RC100-N | — | 12.97 | 12.3 | 0.002436 | 0.0023 |
| RC100-N | | 11.66 | | 0.002179 | |
| RC100-P | 8 | 19.63 | 19.5 | 0.002109 | 0.0022 |
| RC100-P | | 19.43 | | 0.002191 | |

The first strength of the normal cast concrete, the second strength of the normal cast rubber fine aggregate concrete at a rubber substitution rate, and the third strength and the compression stress of the compression-cast rubber fine aggregate concrete at this rubber substitution rate can be acquired. It is worth noting that the rubber substitution rate in this embodiment includes 10%, 15%, 20%, 30%, 40%, 50%, 80% and 100%, which is not limited thereto. The rubber substitution rate can include only a few of them, and can also include other substitution rates. Moreover, the rubber substitution rate can also be non-integer values such as 9% and 17%.

Second, in Step S102 and Step S103, the stress-strain graph (the abscissa represents a strain, and the ordinate represents a stress), the peak stress (strength of the concrete), the initial slope (the elastic modulus) and characteristics of changes in the elastic modulus before and after compression casting at different rubber substitution rates are compared. The constitutive equation of the peak stress of rubber fine aggregate concrete changing with the rubber substitution rate and the compression pouring stress is established.

Step S102, an initial equation between a compressive strength of the normal cast concrete and a compressive strength of corresponding normal cast rubber fine aggregate concrete at any rubber substitution rate is constructed according to the first strength information and the second strength information.

In some embodiments, the first strength information and various second strength information at different rubber substitution rates are analyzed to obtain a first coefficient of the rubber substitution rate in the initial equation. The initial equation between the compressive strength of the normal cast concrete and the compressive strength of corresponding normal cast rubber fine aggregate concrete at any rubber substitution rate is created according to the first coefficient, that is Formula (1).

Specifically, compared with the normal cast concrete, the compressive strength of the normal cast rubber fine aggregate concrete will decrease with the increase of the rubber substitution rate. By setting the rubber substitution rates of 0%, 10%, 15%, 20%, 30%, 40%, 50%, 80% and 100%, the strength is tested to obtain the strengths of the rubber concrete at different rubber substitution rates. By analyzing the relationship between the rubber concrete and the normal cast concrete, the following equation can be obtained by fitting:

$$f_{rc} = f_{co}(1 - 0.717r) \quad \text{Formula (1)}$$

In Formula (1), $f_{rc}$ is the strength of the rubber fine aggregate concrete with different rubber content, $f_{co}$ is the compressive strength of the normal cast concrete, and r is the rubber substitution rate.

Further, first, the first preset equation $f_{rc} = f_{co}(1-ar)$ is obtained according to the decrease of the compressive strength of the normal cast rubber fine aggregate concrete compared with the normal cast concrete as the increase of the rubber substitution rate, where a is the first coefficient. Thereafter, the first coefficient of the rubber substitution rate r (that is, 0.717) is obtained by fitting the second strength of the normal cast rubber fine aggregate concrete at various rubber substitution rates with the first strength of corresponding normal cast concrete, so as to obtain the initial equation Formula (1). It can be understood that the more different types of rubber substitution rates (data in the range of 0-100%), the more accurate the data of the first coefficient obtained through fitting will be.

Step S103, a target equation between the compressive strength of the normal cast concrete and the compression-cast rubber fine aggregate concrete, the rubber substitution rate and a compression stress is constructed according to the third strength information and the initial equation.

In one embodiment, the compressive strength of the normal cast concrete and the strength of corresponding normal compression-cast concrete compressively casted at different compression stresses are acquired. A quadratic function relation between the compressive strength of the normal cast concrete and the strength of the normal compression-cast concrete is obtained according to the compressive strength of the normal cast concrete and the strength of various normal compression-cast concrete. Thereafter, a transition equation between the compressive strength of the compression-cast rubber fine aggregate concrete and the normal cast rubber fine aggregate concrete is obtained according to the initial equation and the third strength information. The target equation between the compressive strength of the normal cast concrete and the compression-cast rubber fine aggregate concrete, the rubber substitution rate, and the compression stress is obtained according to the quadratic function relation and the transition equation. It can be understood that, according to the strength of the normal cast concrete, the strength is only to distinguish it from the compressive strength of the compression-cast rubber fine aggregate concrete. Those skilled in the art can understand that the strength of the normal cast concrete is the compressive strength of the normal cast concrete.

Specifically, the strength of compression-cast concrete is closely related to the compression stress. With the increase of the compression casting stress, the strength of the compression-cast concrete will first increase and then decrease. First, the quadratic function relation between the compressive strength of the normal cast concrete and the strength of the normal compression-cast concrete is determined to obtain the second preset equation $$f_{yc} = f_{co}\left(1 + m\frac{f_p}{f_{co}} + n\left(\frac{f_p}{f_{co}}\right)^2\right),$$

where m is the second coefficient and n is the third coefficient. In this embodiment, the compression casting stresses are set as 0 MPa, 5 MPa, 8 MPa, 8.5 MPa, 9.5 MPa, 13 MPa and 15.5 MPa to analyze the variation law of the strength of normal compression-cast concrete at different compression casting stresses. The second coefficient m (that is, 4.168) and the third coefficient n (that is, −8.634) are obtained through calculating, thus obtaining an intermediate equation Formula (2).

$$f_{yc} = f_{co}\left(1 + 4.168\frac{f_p}{f_{co}} - 8.634\left(\frac{f_p}{f_{co}}\right)^2\right) \quad \text{Formula (2)}$$

In the above Formula (2), $f_{co}$ is the compressive strength of the normal cast concrete, $f_{yc}$ is the strength of the normal compression-cast concrete, and $f_p$ is the applied compression casting stress.

Through the initial equation and the third strength information, the transition equation between the compressive strength of the compression-cast rubber fine aggregate concrete and the normal cast rubber fine aggregate concrete is obtained, that is, Formula (3).

$$f_{oc} = f_{yc}(1-0.717r) \quad \text{Formula (3)}$$

Thereafter, through the intermediate equation Formula (2) and the transition equation Formula (3), that is, the variation law of the strengths of the compression-cast rubber fine aggregate concrete at different compression casting stresses is analyzed to obtain by fitting:

$$f_{cc} = f_{co}(1 - 0.717r)\left(1 + 4.168\frac{f_p}{f_{co}} - 8.634\left(\frac{f_p}{f_{co}}\right)^2\right) \quad \text{Formula (4)}$$

In the above Formula (4), $f_{co}$ is the compressive strength of the normal cast concrete, $f_{cc}$ is the strength of the compression-cast rubber fine aggregate concrete, and $f_p$ is the applied compression casting stress. When $f_p$ is 0, the relationship between the rubber concrete and the substitution rate can be expressed. When r is not 0, the relationship between the compression pouring stress and the strength of compression-cast rubber concrete can be expressed, and the compressive strength of compression-cast rubber fine aggregate concrete can be predicted by this formula.

Finally, in step S104, the compressive strength of the compression-cast rubber fine aggregate concrete at the set rubber substitution rate and compression stress is determined by using the constitutive equation.

S104, target parameters of the compression-cast rubber fine aggregate concrete are acquired, and the target parameters are input into the target equation which outputs a current compressive strength of the compression-cast rubber fine aggregate concrete; where the target parameters include one of the compression-cast rubber substitution rate, the compression casting stress and the compressive strength of normal cast concrete.

It can be understood that in the prior art, on the basis that target parameters including at least one data of the rubber substitution rate, the compression casting stress, and the compressive strength of normal cast concrete have been determined, it is impossible to determine the compressive strength of the compression-cast rubber fine aggregate concrete through other data. That is to say, in the prior art, after the target strength is preset, based on the preset target strength and the determined data (such as the mixture ratio), other data (the rubber substitution rate and the compression stress) cannot be selected to enable the compressive strength of the obtained compression-cast rubber fine aggregate concrete to be greater than or equal to the preset target strength.

In some embodiments, the determined data of the target parameters and a preset target strength of the compression-cast rubber fine aggregate concrete are acquired, the preset target strength as the compressive strength and the determined data are input into the target equation which outputs a data range of parameters to be confirmed, and the target data of the parameters to be confirmed is determined according to the data range; the determined data and the target data are input into the target equation which outputs the current compressive strength of the compression-cast rubber fine aggregate concrete to enable the current compressive strength to be above the preset target strength.

Figure 5:
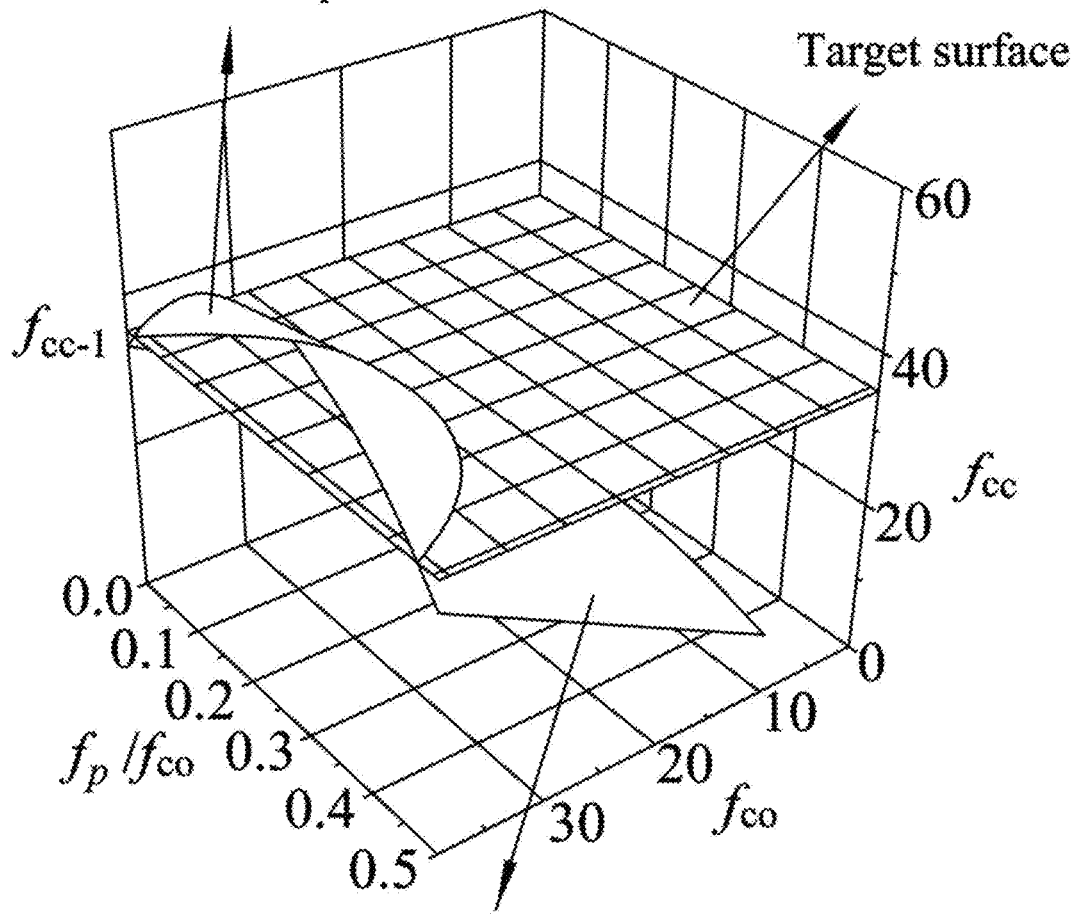
FIG. 5 is a schematic diagram of a relationship between a compressive strength of normal cast concrete, a compression casting stress and a strength of compression-cast rubber fine aggregate concrete when a rubber substitution rate is 20% in a preferred embodiment of a method for determining the compressive bearing capacity of compression-cast rubber fine aggregate concrete according to the present disclosure.

In a first embodiment of the present disclosure, FIG. 5 is a schematic diagram of a relationship between a compressive strength of normal cast concrete, a compression casting stress and a strength of compression-cast rubber fine aggregate concrete when a rubber substitution rate is 20%. The preset target strength and the rubber substitution rate are determined, that is, the target parameter is the rubber substitution rate of the compression-cast rubber fine aggregate concrete. The current substitution rate and the preset target strength of the compression-cast rubber fine aggregate concrete are acquired. The preset target strength as the compressive strength and the current substitution rate are input into the target equation. The target equation outputs data ranges corresponding to the current compressive strength of normal cast concrete and the current compressive pre-stress of the compression-cast rubber fine aggregate concrete. The target compressive strength of normal cast concrete and the target compressive pre-stress are determined according to the data ranges corresponding to the current compressive strength of normal cast concrete and the current compressive pre-stress of the compression-cast rubber fine aggregate concrete. The target compressive strength of normal cast concrete, the current substitution rate and the target compressive pre-stress are input into the target equation which outputs the current compressive strength of the compression-cast rubber fine aggregate concrete to enable the current compressive strength to be above the preset target strength.

Specifically, by setting concrete with different mixture ratios and adding a certain amount of rubber thereto, the rubber substitution rate remains consistent. The compression casting compressive pre-stress is applied to the rubber fine aggregate concrete, so as to reach the target strength.

Figure 6:
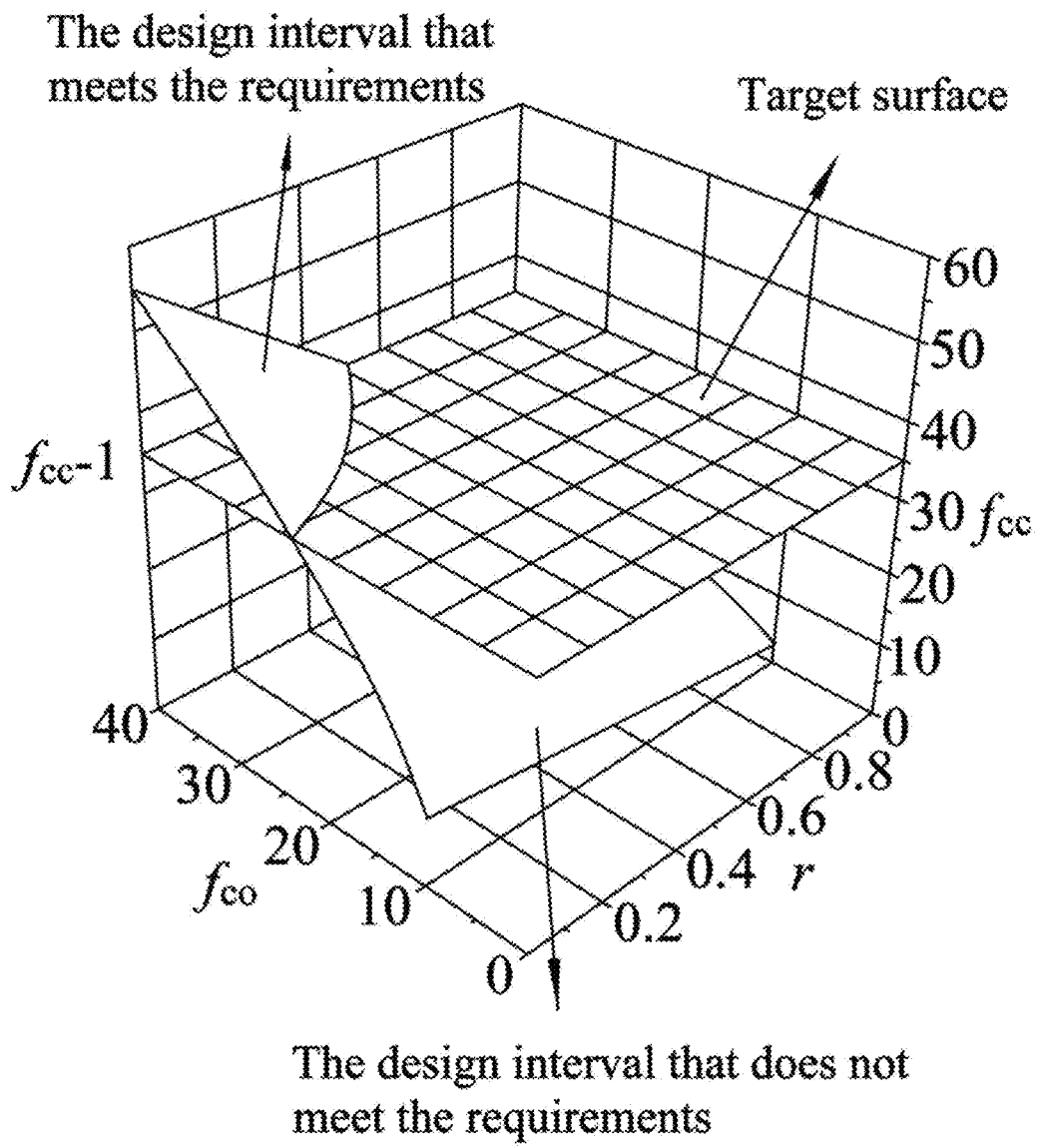
FIG. 6 is a schematic diagram of a relationship between a compressive strength of normal cast concrete, a substitution rate of rubber fine aggregates and a compressive strength of compression-cast rubber fine aggregate concrete when a compression casting compressive prestress is 5 MPa in a preferred embodiment of a method for determining the compressive bearing capacity of compression-cast rubber fine aggregate concrete according to the present disclosure.

In a second embodiment of the present disclosure, FIG. 6 is a schematic diagram of a relationship between a compressive strength of normal cast concrete, a substitution rate of rubber fine aggregates and a compressive strength of compression-cast rubber fine aggregate concrete when a compression casting compressive pre-stress is 5 MPa. The preset target strength and the compression casting stress are determined, that is, the target parameter is the current compressive pre-stress of the compression-cast rubber fine aggregate concrete. The current compressive pre-stress and the preset target strength of the compression-cast rubber fine aggregate concrete are acquired. The preset target strength as the compressive strength and the current compressive pre-stress are input into the target equation. The target equation outputs data ranges corresponding to the current compressive strength of the normal cast concrete and the current substitution rate of the compression-cast rubber fine aggregate concrete. The target compressive strength of normal cast concrete and the target substitution rate are determined according to the data ranges corresponding to the current compressive strength of the normal cast concrete and the current substitution rate of the compression-cast rubber fine aggregate concrete. The target compressive strength of normal cast concrete, the target substitution rate and the current compressive pre-stress are input into the target equation which outputs the current compressive strength of the compression-cast rubber fine aggregate concrete to enable the current compressive strength to be above the preset target strength.

Specifically, by setting concrete with different mixture ratios and adding a certain amount of rubber thereto, the rubber substitution rate changes in a certain interval. A certain compression pouring stress is applied to the compression-cast rubber fine aggregate concrete, so as to reach the target strength.

Figure 7:
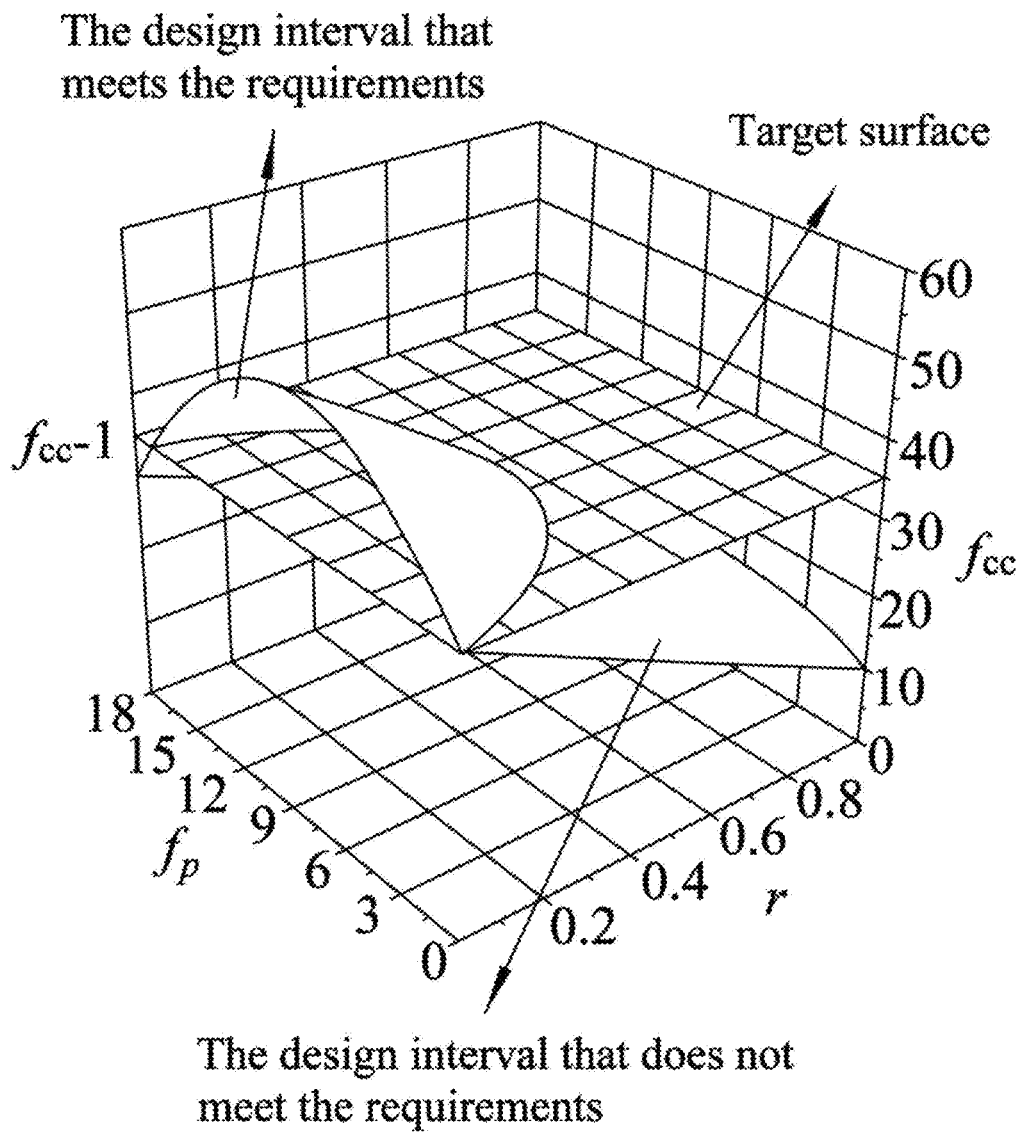
FIG. 7 is a schematic diagram of a relationship between a rubber substitution rate of rubber fine aggregates, a compression casting compressive pre-stress and a compressive strength of compression-cast rubber fine aggregate concrete when a compressive strength of normal cast concrete is 35 MPa in a preferred embodiment of a method for determining the compressive bearing capacity of compression-cast rubber fine aggregate concrete according to the present disclosure.

In a third embodiment of the present disclosure, FIG. 7 is a schematic diagram of a relationship between a rubber substitution rate of rubber fine aggregates, a compression casting compressive pre-stress and a compressive strength of compression-cast rubber fine aggregate concrete when a compressive strength of normal cast concrete is 35 MPa. The preset target strength and the concrete mixture ratio are determined, that is, the target parameter is the compressive strength of normal cast concrete. The current compressive strength of normal cast concrete and the preset target strength of the compression-cast rubber fine aggregate concrete are acquired. The preset target strength as the compressive strength and the current compressive strength of normal cast concrete are input into the target equation. The target equation outputs data ranges corresponding to the current substitution rate and the current compressive pre-stress of the compression-cast rubber fine aggregate concrete. The target substitution rate and the target compressive pre-stress are determined (that is, an area above the $f_{cc-1}$ plane) according to the data ranges corresponding to the current substitution rate and the current compressive pre-stress of the compression-cast rubber fine aggregate concrete. The current compressive strength of normal cast concrete, the target substitution rate and the target compressive pre-stress are input into the target equation which outputs the current compressive strength of the compression-cast rubber fine aggregate concrete to enable the current compressive strength to be above the preset target strength.

Specifically, by setting concrete with the same mixture ratio and adding a certain amount of rubber thereto, the rubber substitution rate changes in a certain interval. Different compression casting compressive pre-stresses are applied to the compression-cast rubber fine aggregate concrete, so as to reach the target strength.

It should be noted that the target parameters can be one, two or three of the rubber substitution rate, the compression casting stress and the compressive strength of normal cast concrete. The compressive strength can be obtained directly and accurately when three of the rubber substitution rate, the compression casting stress and the compressive strength of normal cast concrete are clear. When only one or two of the data are clear, it is necessary to determine the range of unclear data, so that the compressive strength obtained according to the target equation in this range is greater than or equal to the preset target strength, and the unclear data in the corresponding range is determined as the target value. The compressive strength obtained after the target value is substituted into the target equation is above the preset target strength.

In a fourth embodiment of the present disclosure, the target parameters are the current substitution rate and the current compressive casting pre-stress of the compression-cast rubber fine aggregate concrete. The current substitution rate, the current compressive casting pre-stress and the preset target strength of the compression-cast rubber fine aggregate concrete are acquired. The preset target strength as the compressive strength, the current substitution rate and the current compressive casting pre-stress are input into the target equation. The target equation outputs the current compressive strength of normal cast concrete. The set mixture ratio range of the normal cast concrete is obtained according to the current compressive strength of normal cast concrete, and the target mixture ratio is determined according to the set mixture ratio range. The target compressive strength of normal cast concrete is obtained according to the target mixture ratio. The target compressive strength of normal cast concrete, the current substitution rate and the current compressive casting pre-stress are input into the target equation which outputs the current compressive strength of the compression-cast rubber fine aggregate concrete to enable the current compressive strength to be above the preset target strength.

Specifically, the preset target strength, the rubber substitution rate and the compression casting stress (the compression stress and the compressive casting pre-stress) are determined. By setting concrete with the different mixture ratios and adding a certain amount of rubber thereto, the rubber substitution rate remains consistent. The determined compression casting compressive pre-stress is applied to compression-cast rubber fine aggregate concrete so that the compressive strength of the compression-cast rubber fine aggregate concrete can be above the preset target strength. The abscissa is the compressive strength of normal cast concrete, and the ordinate is the compressive strength of the compression-cast rubber fine aggregate concrete, $f_{cc-1}$ is the preset target strength, and $f_{cn}$ is the minimum compressive strength of normal cast concrete that meets the requirements, so as to obtain the concrete mixture ratio correspondingly.

In a fifth embodiment of the present disclosure, the preset target strength, the rubber substitution rate and the concrete mixture ratio are determined, that is, the target parameters are the current substitution rate and the current strength of the compression-cast rubber fine aggregate concrete. By setting concrete with the same mixture ratio and adding a certain amount of rubber thereto, the rubber substitution rate keeps consistent. Different compression casting compressive pre-stresses are applied to the compression-cast rubber fine aggregate concrete so that the compressive strength of the compression-cast rubber fine aggregate concrete can be above the preset target strength. FIG. 7 shows the relationship between a compression casting stress and a strength of concrete, in which the horizontal axis represents the applied compression casting stress, and the vertical axis represents the strength of the concrete. After the target strength of the concrete $f_{cc-1}$ is determined, the initial minimum compression casting stress $f_{pm}$ which needs to be applied to obtain this strength can be obtained, and the actual minimum compression pouring stress $f_{pp}$ can be obtained. At the same time, it is necessary to prevent the fact that the stress applied by compression casting cannot lead to the crushing of coarse aggregates, which will lead to the reduction of the compression casting effect. That is, the applied compression casting stress cannot be greater than $f_{pm}$.

In a sixth embodiment of the present disclosure, the preset target strength, the compression casting stress and the concrete mixture ratio are determined, that is, the target parameters are the current compressive pre-stress of the compression-cast rubber fine aggregate concrete and the current compressive strength of normal cast concrete. By setting concrete with the same mixture ratio and adding a certain amount of rubber thereto, the rubber substitution rate changes in a certain interval. The determined compression casting compressive pre-stress is applied to the compression-cast rubber fine aggregate concrete so that the compressive strength of compression-cast rubber fine aggregate concrete is above the preset target strength.

Figure 8:
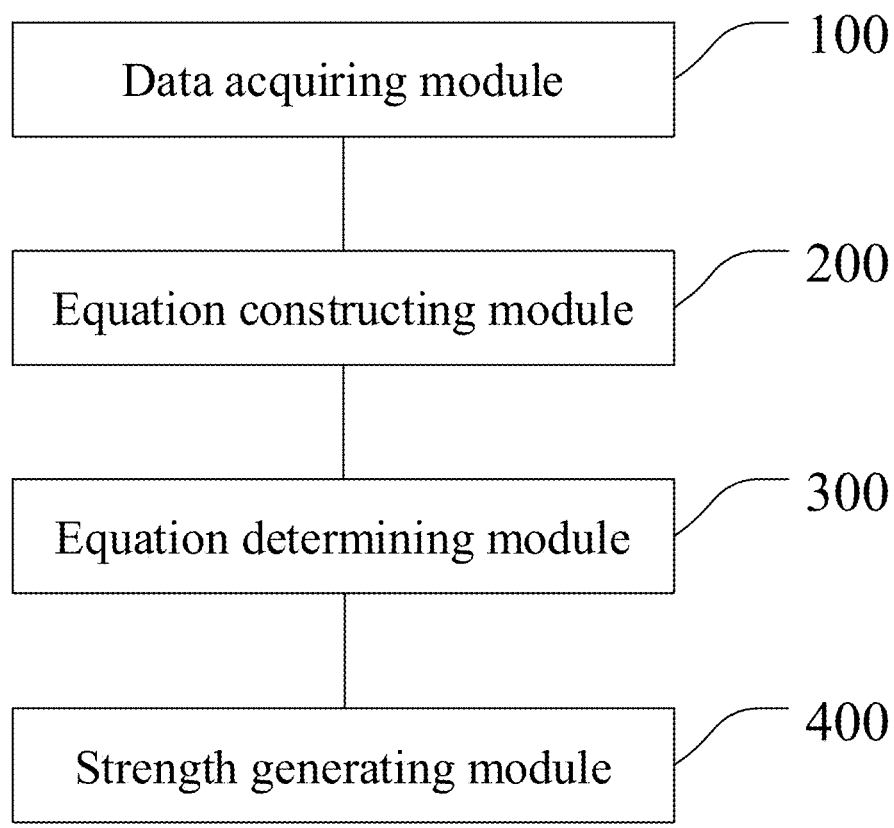
FIG. 8 is a schematic structural diagram of a preferred embodiment of a system for determining the compressive bearing capacity of compression-cast rubber fine aggregate concrete according to the present disclosure.

Further, as shown in FIG. 8, based on the above-mentioned method for determining the compressive bearing capacity of compression-cast rubber fine aggregate concrete, the present disclosure further provides a system for determining the compressive bearing capacity of the compression-cast rubber fine aggregate concrete, the system for determining the compressive bearing capacity of the compression-cast rubber fine aggregate concrete includes:

a data acquiring module 100, which is configured to acquire first strength information of normal cast concrete, second strength information of corresponding normal cast rubber fine aggregate concrete at a rubber substitution rate, and third strength information of compression-cast rubber fine aggregate concrete at the rubber substitution rate;

an equation constructing module 200, which is configured to construct an initial equation between a compressive strength of normal cast concrete and a compressive strength of corresponding normal cast rubber fine aggregate concrete at any rubber substitution rate according to the first strength information and the second strength information;

an equation determining module 300, which is configured to construct a target equation between a compressive strength of normal cast concrete, a compressive strength of the compression-cast rubber fine aggregate concrete, the rubber substitution rate and a compression stress according to the third strength information and the initial equation;

a strength generating module 400, which is configured to acquire target parameters of the compression-cast rubber fine aggregate concrete, and input the target parameters into the target equation which outputs a current compressive strength of the compression-cast rubber fine aggregate concrete; where the target parameters include one of the rubber substitution rate, the compression stress and the compressive strength of normal cast concrete.

Figure 9:
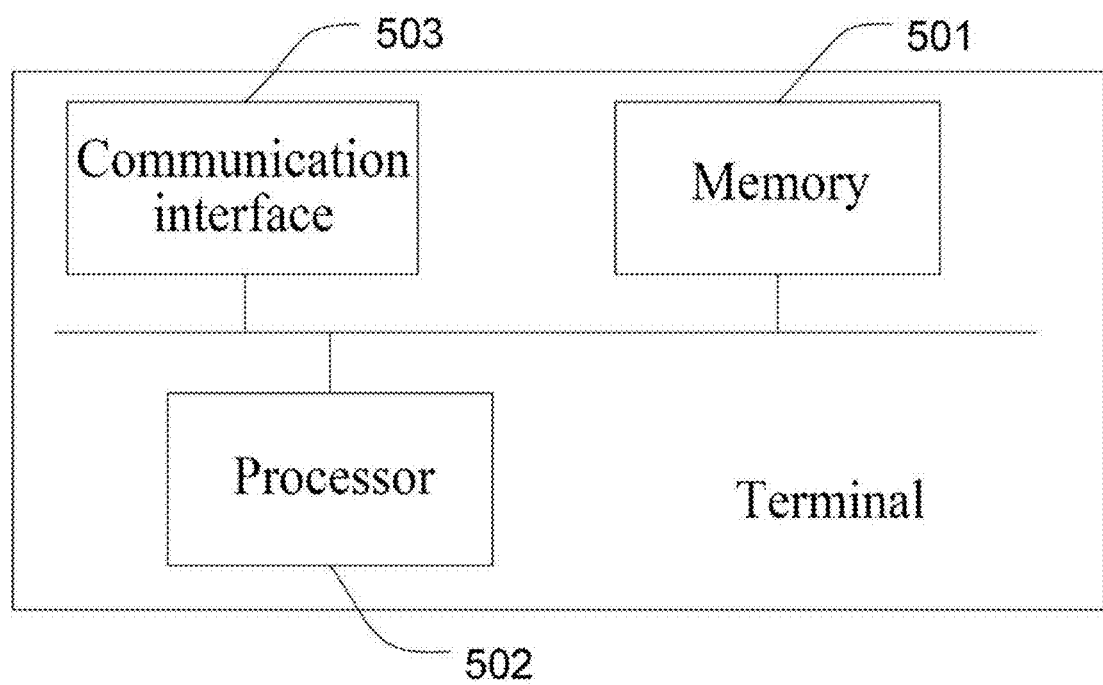
FIG. 9 is a schematic structural diagram of a preferred embodiment of a terminal according to the present disclosure.

Further, as shown in FIG. 9, the present disclosure further provides a terminal, the terminal includes a memory, a processor, and a program for determining a compressive bearing capacity of compression-cast rubber fine aggregate concrete, which is stored in the memory and is operable on the processor, and the program for determining the compressive bearing capacity of compression-cast rubber fine aggregate concrete, when executed by the processor, implements steps of the method for determining the compressive bearing capacity of compression-cast rubber fine aggregate concrete described above.

Further, the terminal further includes:

a communication interface 503, which is configured to communicate between the memory 501 and the processor 502;

a memory 501, which is configured to store a computer program which is operable on the processor 502.

The memory 501 may include a high-speed RAM memory, and may also include a non-volatile memory, such as at least one disk memory.

If the memory 501, the processor 502, and the communication interface 503 are independently implemented, the communication interface 503, the memory 501, and the processor 502 can be connected to each other through a bus and complete communication with each other. The bus can be an Industry Standard Architecture (ISA) bus, a Peripheral Component Interconnect (PCI) bus or an Extended Industry Standard Architecture (EIS) bus, etc. The bus can be classified as an address bus, a data bus and a control bus, etc. For the convenience of representation, only one thick line is used in FIG. 9, but it does not mean that there is only one bus or one type of bus.

Alternatively, in the specific implementation, if the memory 501, the processor 502 and the communication interface 503 are integrated on one chip, the memory 501, the processor 502 and the communication interface 503 can communicate with each other through an internal interface.

The processor 502 may be a Central Processing Unit (CPU), an Application Specific Integrated Circuit (ASIC), or one or more integrated circuits configured to implement the embodiments of the present disclosure.

The embodiment further provides a computer-readable storage medium, on which a computer program is stored, which, when executed by a processor, implements the method for determining the compressive bearing capacity of compression-cast rubber fine aggregate concrete described above.

An embodiment of the present disclosure provides a computer program product, including a computer program, which, when executed by a processor, implements the method for determining the compressive bearing capacity of compression-cast rubber fine aggregate concrete as provided in any of the embodiments corresponding to FIG. 2 of the present disclosure.

In the description of this specification, descriptions referring to the terms "one embodiment", "some embodiments", "examples", "specific examples" or "some examples" mean that specific features, structures, materials or characteristics described in combination with this embodiment or example are included in at least one embodiment or example of the present disclosure. In this specification, the schematic expressions of the above terms do not necessarily refer to the same embodiment or example. Moreover, the specific features, structures, materials or characteristics described can be combined in any one or N embodiments or examples in a suitable way. In addition, those skilled in the art can incorporate and combine different embodiments or examples and features of different embodiments or examples described in this specification without contradicting each other.

In addition, the terms "first" and "second" are only used for the purpose of description, and cannot be understood as indicating or implying relative importance or implicitly indicating the number of indicated technical features. Therefore, the features defined as "first" and "second" may include at least one of these features explicitly or implicitly. In the description of the present disclosure, "N" means at least two, such as two, three, etc., unless otherwise specifically defined.

Any process or method description in the flowchart or otherwise described herein can be understood as representing a module, segment or part of a code that includes one or N executable instructions for implementing the steps of customized logic functions or processes, and the scope of preferred embodiments of the present disclosure includes other implementations, in which functions can be executed out of the order shown or discussed, including in a substantially simultaneous manner or in a reverse order according to the functions involved, which should be understood by those skilled in the art to which the embodiments of the present disclosure belong.

For example, the logic and/or steps represented in the flowchart or described in other ways herein can be regarded as a sequenced list of executable instructions for implementing logical functions, and can be embodied in any computer-readable storage medium for use by or in combination with an instruction execution system, an instruction execution apparatus or an instruction execution device (such as a computer-based system, a system including a processor or other systems that can obtain instructions from and execute instructions from the instruction execution system, the instruction execution apparatus or the instruction execution device). In terms of this specification, a "computer-readable storage medium" can be any apparatus that can contain, store, communicate, propagate or transmit a program for use by or in connection with an instruction execution system, an instruction execution apparatus or an instruction execution device. More specific examples (a non-exhaustive list) of computer-readable storage media include: an electrical connection part (an electronic device) with one or N wires, a portable computer disk cartridge (a magnetic device), a Random Access Memory (RAM), a Read-Only Memory (ROM), an erasable Programmable read-only memory (EPROM or a flash memory), an optical fiber device, and a portable CD-Read-Only Memory (CD-ROM). In addition, the computer-readable storage medium can even be paper or other suitable medium on which the program can be printed, because the program can be electronically obtained by optically scanning the paper or other medium, followed by editing, interpreting or otherwise processing the program if necessary, and then the program is stored in the computer memory.

It should be understood that various parts of the present disclosure can be implemented in hardware, software, firmware or a combination thereof. In the above embodiments, N steps or methods can be implemented in software or firmware stored in a memory and executed by an appropriate instruction execution system. For example, if the N steps or methods are implemented by hardware, as in another embodiment, the N steps or methods can be implemented by any one of the following technologies known in the art or the combination thereof: a discrete logic circuit with a logic gate for implementing logic functions on data signals, an application specific integrated circuit with appropriate combinational logic gates, a Programmable Gate Array (PGA), a Field Programmable Gate Array (FPGA), etc.

Those skilled in the art can understand that all or part of the steps carried by the method of the above embodiment can be completed by instructing related hardware through a program. The program can be stored in a computer-readable storage medium. The program, when executed, includes one of the steps of the method embodiment or the combination thereof.

In addition, various functional units in various embodiments of the present disclosure can be integrated into one processing module, or each unit can exist physically alone, or two or more units can be integrated into one module. The above-integrated modules can be implemented in the form of hardware or software functional modules. The integrated modules can also be stored in a computer-readable storage medium if it is implemented in the form of a software functional module and sold or used as an independent product.

The storage medium mentioned above can be a read-only memory, a magnetic disk or an optical disk, etc. Although the embodiments of the present disclosure have been shown and described above, it can be understood that the above embodiments are exemplary and cannot be understood as limitations of the present disclosure. Those skilled in the art can make changes, modifications, substitutions and variations to the above embodiments within the scope of the present disclosure.

It should be understood that the application of the present disclosure is not limited to the above-mentioned examples. Those skilled in the art can make improvements or changes according to the above description. All of these improvements and changes should belong to the scope of protection of the appended claims of the present disclosure.

What is claimed is:

1. A method for determining a compressive bearing capacity of compression-cast rubber fine aggregate concrete, the method being implemented by a terminal comprising a memory, a processor, and a program for determining the compressive bearing capacity of compression-cast rubber fine aggregate concrete, wherein the method for determining the compressive bearing capacity of compression-cast rubber fine aggregate concrete comprises:

preparing normal cast concrete, corresponding normal cast rubber fine aggregate concrete at a rubber substitution rate, and preparing compression-cast rubber fine aggregate concrete at the rubber substitution rate by using a concrete compression casting device;

carrying out compressive tests on the normal cast concrete, the corresponding normal cast rubber fine aggregate concrete at the rubber substitution rate and the compression-cast rubber fine aggregate concrete at the rubber substitution rate, respectively, by using a pressure testing machine, so as to acquire first strength information of the normal cast concrete, second strength information of the corresponding normal cast rubber fine aggregate concrete at the rubber substitution rate, and third strength information of the compression-cast rubber fine aggregate concrete at the rubber substitution rate;

constructing an initial equation between a compressive strength of the normal cast concrete and a compressive strength of corresponding normal cast rubber fine aggregate concrete at any rubber substitution rate according to the first strength information and the second strength information;

constructing a target equation between the compressive strength of the normal cast concrete, a compressive strength of the compression-cast rubber fine aggregate concrete, the rubber substitution rate and a compression stress according to the third strength information and the initial equation;

acquiring target parameters of the compression-cast rubber fine aggregate concrete, and inputting the target parameters into the target equation which outputs a current compressive strength of the compression-cast rubber fine aggregate concrete; wherein the target parameters comprise one of the rubber substitution rate, the compression stress and the compressive strength of the normal cast concrete;

wherein the method for determining the compressive bearing capacity of compression-cast rubber fine aggregate concrete further comprises: acquiring the compressive strength of the normal cast concrete and strengths of corresponding normal compression-cast concrete compressively cast at different compression stresses; obtaining a quadratic function relation between the compressive strength of the normal cast concrete and a strength of the normal compression-cast concrete according to the compressive strength of the normal cast concrete and the strengths of various normal compression-cast concrete;

wherein said constructing a target equation between the compressive strength of the normal cast concrete, a compressive strength of the compression-cast rubber fine aggregate concrete, the rubber substitution rate and a compression stress according to the third strength information and the initial equation specifically comprises: obtaining a transition equation between the compressive strength of the compression-cast rubber fine aggregate concrete and the compressive strength of the normal cast rubber fine aggregate concrete according to the initial equation and the third strength information; obtaining the target equation between the compressive strength of the normal cast concrete, the compressive strength of the compression-cast rubber fine aggregate concrete, the rubber substitution rate and the compression stress according to the quadratic function relation and the transition equation.

2. The method for determining the compressive bearing capacity of compression-cast rubber fine aggregate concrete according to claim 1, wherein mixture ratios of cementing materials, coarse aggregates and fine aggregates among the normal cast concrete, the normal cast rubber fine aggregate concrete at the rubber substitution rate and the compression-cast rubber fine aggregate concrete at the rubber substitution rate are the same;

acquiring first strength information of normal cast concrete, second strength information of corresponding normal cast rubber fine aggregate concrete at a rubber substitution rate specifically comprises:

carrying out a compressive test on the normal cast concrete to obtain the first strength information of the normal cast concrete;

carrying out compressive tests on various normal cast rubber fine aggregate concrete at different rubber substitution rates to obtain the second strength information corresponding to the various normal cast rubber fine aggregate concrete.

3. The method for determining the compressive bearing capacity of compression-cast rubber fine aggregate concrete according to claim 2, wherein said constructing an initial equation between a compressive strength of the normal cast concrete and a compressive strength of corresponding normal cast rubber fine aggregate concrete at any rubber substitution rate according to the first strength information and the second strength information specifically comprises:

analyzing the first strength information and various second strength information at different rubber substitution rates to obtain a first coefficient of the rubber substitution rate;

generating the initial equation between the compressive strength of the normal cast concrete and the compressive strength of corresponding normal cast rubber fine aggregate concrete at any rubber substitution rate according to the first coefficient.

4. The method for determining the compressive bearing capacity of compression-cast rubber fine aggregate concrete according to claim 1, wherein acquiring third strength information of compression-cast rubber fine aggregate concrete at the rubber substitution rate specifically comprises:

acquiring respective compression stresses of various compression-cast rubber fine aggregate concrete at different rubber substitution rates, wherein the rubber substitution rates of the various compression-cast rubber fine aggregate concrete correspond to and are same as rubber substitution rates of various normal cast rubber fine aggregate concrete;

carrying out a compressive test on the compression-cast rubber fine aggregate concrete at a corresponding rubber substitution rate according to the compression stress to obtain the third strength information corresponding to each of the various compression-cast rubber fine aggregate concrete.

5. The method for determining the compressive bearing capacity of compression-cast rubber fine aggregate concrete according to claim 2, wherein said acquiring target parameters of the compression-cast rubber fine aggregate concrete, and inputting the target parameters into the target equation which outputs a current compressive strength of the compression-cast rubber fine aggregate concrete specifically comprises:

acquiring determined data of the target parameters and the preset target strength of the compression-cast rubber fine aggregate concrete, inputting the preset target strength as the compressive strength and the determined data into the target equation which outputs a data range of parameters to be confirmed, and determining target data of the parameters to be confirmed according to the data range;

inputting the determined data and the target data into the target equation which outputs a current compressive strength of the compression-cast rubber fine aggregate concrete to enable the current compressive strength to be above the preset target strength.

6. A terminal, wherein the terminal comprises a memory, a processor, and a program for determining a compressive bearing capacity of compression-cast rubber fine aggregate concrete, which is stored in the memory and is operable on the processor, and the program for determining the compressive bearing capacity of compression-cast rubber fine aggregate concrete, when executed by the processor, implements steps of the method for determining the compressive bearing capacity of compression-cast rubber fine aggregate concrete according to claim 1.

7. A non-transitory computer-readable storage medium, wherein the computer-readable storage medium stores a program for determining a compressive bearing capacity of compression-cast rubber fine aggregate concrete, and the program for determining the compressive bearing capacity of compression-cast rubber fine aggregate concrete, when executed by a processor, implements steps of the method for determining the compressive bearing capacity of compression-cast rubber fine aggregate concrete according to claim 1.

8. The terminal according to claim 6, wherein mixture ratios of cementing materials, coarse aggregates and fine aggregates among the normal cast concrete, the normal cast rubber fine aggregate concrete at the rubber substitution rate and the compression-cast rubber fine aggregate concrete at the rubber substitution rate are the same;
   acquiring first strength information of normal cast concrete, second strength information of corresponding normal cast rubber fine aggregate concrete at a rubber substitution rate specifically comprises:
   carrying out a compressive test on the normal cast concrete to obtain the first strength information of the normal cast concrete;
   carrying out compressive tests on various normal cast rubber fine aggregate concrete at different rubber substitution rates to obtain the second strength information corresponding to the various normal cast rubber fine aggregate concrete.

9. The terminal according to claim 8, wherein said constructing an initial equation between a compressive strength of the normal cast concrete and a compressive strength of corresponding normal cast rubber fine aggregate concrete at any rubber substitution rate according to the first strength information and the second strength information specifically comprises:
   analyzing the first strength information and various second strength information at different rubber substitution rates to obtain a first coefficient of the rubber substitution rate;
   generating the initial equation between the compressive strength of the normal cast concrete and the compressive strength of corresponding normal cast rubber fine aggregate concrete at any rubber substitution rate according to the first coefficient.

10. The terminal according to claim 6, wherein acquiring third strength information of compression-cast rubber fine aggregate concrete at the rubber substitution rate specifically comprises:
    acquiring respective compression stresses of various compression-cast rubber fine aggregate concrete at different rubber substitution rates, wherein the rubber substitution rates of the various compression-cast rubber fine aggregate concrete correspond to and are the same as rubber substitution rates of various normal cast rubber fine aggregate concrete;
    carrying out a compressive test on the compression-cast rubber fine aggregate concrete at a corresponding rubber substitution rate according to the compression stress to obtain the third strength information corresponding to each of the various compression-cast rubber fine aggregate concrete.

11. The terminal according to claim 8, wherein said acquiring target parameters of the compression-cast rubber fine aggregate concrete, and inputting the target parameters into the target equation which outputs a current compressive strength of the compression-cast rubber fine aggregate concrete specifically comprises:
    acquiring determined data of the target parameters and the preset target strength of the compression-cast rubber fine aggregate concrete, inputting the preset target strength as the compressive strength and the determined data into the target equation which outputs a data range of parameters to be confirmed, and determining target data of the parameters to be confirmed according to the data range;
    inputting the determined data and the target data into the target equation which outputs a current compressive strength of the compression-cast rubber fine aggregate concrete to enable the current compressive strength to be above the preset target strength.

12. The non-transitory computer-readable storage medium according to claim 7, wherein mixture ratios of cementing materials, coarse aggregates and fine aggregates among the normal cast concrete, the normal cast rubber fine aggregate concrete at the rubber substitution rate and the compression-cast rubber fine aggregate concrete at the rubber substitution rate are the same;
    acquiring first strength information of normal cast concrete, second strength information of corresponding normal cast rubber fine aggregate concrete at a rubber substitution rate specifically comprises:
    carrying out a compressive test on the normal cast concrete to obtain the first strength information of the normal cast concrete;
    carrying out compressive tests on various normal cast rubber fine aggregate concrete at different rubber substitution rates to obtain the second strength information corresponding to the various normal cast rubber fine aggregate concrete.

13. The non-transitory computer-readable storage medium according to claim 12, wherein said constructing an initial equation between a compressive strength of the normal cast concrete and a compressive strength of corresponding normal cast rubber fine aggregate concrete at any rubber substitution rate according to the first strength information and the second strength information specifically comprises:
    analyzing the first strength information and various second strength information at different rubber substitution rates to obtain a first coefficient of the rubber substitution rate;
    generating the initial equation between the compressive strength of the normal cast concrete and the compressive strength of corresponding normal cast rubber fine aggregate concrete at any rubber substitution rate according to the first coefficient.

14. The non-transitory computer-readable storage medium according to claim 7, wherein acquiring third strength information of compression-cast rubber fine aggregate concrete at the rubber substitution rate specifically comprises:
    acquiring respective compression stresses of various compression-cast rubber fine aggregate concrete at different rubber substitution rates, wherein the rubber substitution rates of the various compression-cast rubber fine aggregate concrete correspond to and are the same as rubber substitution rates of various normal cast rubber fine aggregate concrete;

carrying out a compressive test on the compression-cast rubber fine aggregate concrete at a corresponding rubber substitution rate according to the compression stress to obtain the third strength information corresponding to each of the various compression-cast rubber fine aggregate concrete.

15. The non-transitory computer-readable storage medium according to claim 12, wherein said acquiring target parameters of the compression-cast rubber fine aggregate concrete, and inputting the target parameters into the target equation which outputs a current compressive strength of the compression-cast rubber fine aggregate concrete specifically comprises:

acquiring determined data of the target parameters and the preset target strength of the compression-cast rubber fine aggregate concrete, inputting the preset target strength as the compressive strength and the determined data into the target equation which outputs a data range of parameters to be confirmed, and determining target data of the parameters to be confirmed according to the data range;

inputting the determined data and the target data into the target equation which outputs a current compressive strength of the compression-cast rubber fine aggregate concrete to enable the current compressive strength to be above the preset target strength.

16. A system for determining a compressive bearing capacity of compression-cast rubber fine aggregate concrete, wherein the system for determining the compressive bearing capacity of compression-cast rubber fine aggregate concrete comprises:

a concrete compression casting device configured for preparing compression-cast rubber fine aggregate concrete at a rubber substitution rate;

a pressure testing machine configured for carrying out compressive tests on normal cast concrete, corresponding normal cast rubber fine aggregate concrete at the rubber substitution rate and the compression-cast rubber fine aggregate concrete at the rubber substitution rate respectively, and a terminal comprising a memory, a processor, and a program for determining the compressive bearing capacity of compression-cast rubber fine aggregate concrete, wherein the program for determining the compressive bearing capacity of compression-cast rubber fine aggregate concrete comprises:

a data acquiring module configured to acquire first strength information of the normal cast concrete, second strength information of the corresponding normal cast rubber fine aggregate concrete at the rubber substitution rate, and third strength information of the compression-cast rubber fine aggregate concrete at the rubber substitution rate;

an equation constructing module configured to construct an initial equation between a compressive strength of the normal cast concrete and a compressive strength of corresponding normal cast rubber fine aggregate concrete at any rubber substitution rate according to the first strength information and the second strength information;

wherein the system for determining the compressive bearing capacity of compression-cast rubber fine aggregate concrete is further configured for acquiring the compressive strength of the normal cast concrete and strengths of corresponding normal compression-cast concrete compressively cast at different compression stresses; and obtaining a quadratic function relation between the compressive strength of the normal cast concrete and a strength of the normal compression-cast concrete according to the compressive strength of the normal cast concrete and the strengths of various normal compression-cast concrete;

an equation determining module configured to construct a target equation between a compressive strength of the normal cast concrete, a compressive strength of the compression-cast rubber fine aggregate concrete, the rubber substitution rate and a compression stress according to the third strength information and the initial equation;

wherein the equation determining module is further configured for obtaining a transition equation between the compressive strength of the compression-cast rubber fine aggregate concrete and the compressive strength of the normal cast rubber fine aggregate concrete according to the initial equation and the third strength information; and obtaining the target equation between the compressive strength of the normal cast concrete, the compressive strength of the compression-cast rubber fine aggregate concrete, the rubber substitution rate and the compression stress according to the quadratic function relation and the transition equation;

a strength generating module configured to acquire target parameters of the compression-cast rubber fine aggregate concrete, and input data of the target parameters into the target equation which outputs a current compressive strength of the compression-cast rubber fine aggregate concrete; wherein the target parameters comprise one of the rubber substitution rate, the compression stress and the compressive strength of the normal cast concrete.

* * * * *